(12) United States Patent
Uenishi

(10) Patent No.: US 9,429,231 B2
(45) Date of Patent: Aug. 30, 2016

(54) FLUSHING CIRCUIT FOR HYDRAULIC CYLINDER DRIVE CIRCUIT

(75) Inventor: Yukio Uenishi, Osaka (JP)

(73) Assignee: U-TEC Co., Ltd., Osaka (JP)

( * ) Notice: Subject to any disclaimer, the term of this patent is extended or adjusted under 35 U.S.C. 154(b) by 0 days.

(21) Appl. No.: 14/387,121

(22) PCT Filed: Mar. 22, 2012

(86) PCT No.: PCT/JP2012/057288
§ 371 (c)(1),
(2), (4) Date: Sep. 22, 2014

(87) PCT Pub. No.: WO2013/140561
PCT Pub. Date: Sep. 26, 2013

(65) Prior Publication Data
US 2015/0082784 A1    Mar. 26, 2015

(51) Int. Cl.
*F15B 13/02*     (2006.01)
*F16H 61/4104*    (2010.01)
(Continued)

(52) U.S. Cl.
CPC ......... *F16H 61/4104* (2013.01); *F15B 21/005* (2013.01); *F15B 21/041* (2013.01);
(Continued)

(58) Field of Classification Search
CPC F15B 13/01; F15B 13/021; F15B 2211/611; F15B 2211/0358
See application file for complete search history.

(56) References Cited

U.S. PATENT DOCUMENTS 2,588,520 A * 3/1952 Halgren et al. ................. 91/420
2,756,724 A * 7/1956 Stewart et al. ................. 91/420
(Continued)

FOREIGN PATENT DOCUMENTS

JP    S53-48991 U    4/1978
JP    63-56304 U    4/1988
(Continued)

OTHER PUBLICATIONS

English Translation of the International Preliminary Report on Patentability for corresponding International Application No. PCT/JP2012/057288, mailed Oct. 23, 2014 (5 pages).
(Continued)

*Primary Examiner* — F. Daniel Lopez
(74) *Attorney, Agent, or Firm* — Osha Liang LLP

(57) ABSTRACT

The present invention provides a flushing circuit for a hydraulic cylinder drive circuit, by which the flushing of the circuit is conducted while protecting precision apparatuses of a control valve unit, because the flushing of a reciprocating hydraulic cylinder and its drive circuit is conducted while bypassing the control valve unit.
In a hydraulic oil supply/discharge circuit connecting a tank of hydraulic oil, a hydraulic pump generating pressurized hydraulic oil, and a hydraulic cylinder with one another, a control valve unit in which at least a direction switching valve is provided in the vicinity of the hydraulic pump and the oil tank and a multifunction valve having a bypass circuit in the vicinity of the hydraulic cylinder are provided, and a bypass circuit bypassing the control valve unit is provided to branch from a hydraulic oil supply/discharge circuit between the multifunction valve and the control valve unit. At the time of the flushing of the hydraulic cylinder and the hydraulic oil supply/discharge circuit, contaminated hydraulic oil returns the tank without passing through the control valve unit, with the result that the control valve unit is protected from the contaminated hydraulic oil.

4 Claims, 7 Drawing Sheets

(51) Int. Cl.
*F15B 21/00* (2006.01)
*F16H 61/4043* (2010.01)
*F15B 21/04* (2006.01)
*F15B 13/08* (2006.01)

(52) U.S. Cl.
CPC ......... *F16H61/4043* (2013.01); *F15B 13/081* (2013.01); *F15B 2211/3058* (2013.01); *F15B 2211/3138* (2013.01); *F15B 2211/40515* (2013.01); *F15B 2211/40584* (2013.01); *F15B 2211/411* (2013.01); *F15B 2211/41527* (2013.01); *F15B 2211/41572* (2013.01); *F15B 2211/41581* (2013.01); *F15B 2211/611* (2013.01)

(56) References Cited

U.S. PATENT DOCUMENTS 3,795,178 A * 3/1974 Roche .............................. 91/420
4,354,351 A * 10/1982 Dezelan ........................... 60/456
5,072,584 A * 12/1991 Mauch et al. ................... 60/378

FOREIGN PATENT DOCUMENTS

| JP | 7-2606 U | 1/1995 |
| JP | 2003-194009 A | 7/2003 |
| JP | 2005-351430 A | 12/2005 |
| JP | 2009-228899 A | 10/2009 |

OTHER PUBLICATIONS

International Search Report for corresponding international Application No. PCT/JP2012/057288, mailed Apr. 12, 2012 (2 pages).
International Preliminary Report on Patentability for corresponding international Application No. PCT/JP2012/057288, mailed Aug. 5, 2014 (41 pages).
Notice of Reasons for Rejection for corresponding Japanese Application No. 2010-215756, mailed Feb. 26, 2013 (3 pages).
Notice of Reasons for Rejection for corresponding Japanese Application No. 2013-172159, mailed Jul. 29, 2014 (3 pages).

* cited by examiner

FLUSHING CIRCUIT FOR HYDRAULIC CYLINDER DRIVE CIRCUIT

TECHNICAL FIELD

The present invention relates to a flushing circuit used for replacing hydraulic oil and performing cleaning (hereinafter, flushing) in a drive circuit in which hydraulic oil moves in the circuit but does not circulate therein, such as a reciprocating hydraulic cylinder drive circuit used for a driving unit of a water gate.

BACKGROUND ART

An example of the water gate driven by the hydraulic cylinder is a tumble gate system provided across a river. Such a tumble gate system is provided for effectively utilizing river water resources by controlling the degree of tumbling of the gate provided across the river, for preventing sea water from being mixed with fresh water at the mouth of a river, or for protection against the tide at the seaside.

A tumble gate system for effectively utilizing water resources is structured such that, piers are formed at the respective sides of the tumble gate provided across the river, in each of these piers a shaft to which the tumble gate is fixed and a cum which is fixed to the shaft and is rotatable by a hydraulic cylinder are provided, and the degree of tumbling is controlled by the shaft of the cum which is rotated by the hydraulic cylinder and provided in each pier.

A reciprocating hydraulic cylinder drive circuit which functions as the driving source of the tumble gate is divided by a hydraulic cylinder, and hydraulic oil required for moving the hydraulic cylinder (i.e., the amount of which is equivalent to the capacity of the hydraulic cylinder) reciprocates in the circuit. For this reason, the hydraulic oil in the drive circuit and the hydraulic cylinder is stagnant. On this account, after long use, garbage entering the drive circuit and the hydraulic cylinder and air entering through a seal portion of the hydraulic cylinder may explode in the hydraulic cylinder due to adiabatic compression, with the result that the hydraulic oil may be contaminated by cinders of the sealing or the like.

The hydraulic oil contaminated in this way must be flushed out to prevent the occurrence of functional disorder of the hydraulic cylinder and its controller. In this regard, in the hydraulic cylinder drive circuit, the hydraulic oil in the drive circuit merely moves in accordance with the operation of the hydraulic cylinder, and it is therefore difficult to flush out contaminated hydraulic oil. Focusing on this problem, Patent Literature 1 recites that, a hydraulic oil supply circuit for supplying hydraulic oil to a hydraulic cylinder and a hydraulic oil discharge circuit are provided as shown in FIG. 7, and flushing is carried out in such a way that pressurized hydraulic oil discharged from a hydraulic pump is supplied from the hydraulic oil supply circuit to the hydraulic oil discharge circuit via the hydraulic cylinder and then returns the tank.

Now, the details of Patent Literature 1 will be given with reference to FIG. 7. As shown in FIG. 7, the hydraulic cylinder 100 is a ram cylinder, and this hydraulic cylinder 100 is structured such that a ram 102 is inserted into a cylinder main body 101 and the cylinder main body 101 and the ram 102 constitute a pressure chamber 103 penetrated by a port 104 and a port 105. The port 104 is connected to the hydraulic oil supply circuit 111 to which the discharge side of the hydraulic pump 110 is connected, whereas the port 105 is connected to the hydraulic oil discharge circuit 112 which is connected to the tank 107 of the hydraulic oil.

To the hydraulic oil supply circuit 111, a supply-side poppet valve 121 arranged to connect/disconnect the hydraulic cylinder 100 to/from the hydraulic pump 110, a flow rate control valve 123, and a supply-side stop valve 125 are connected. To the port 105, a discharge-side poppet valve 122, a flow rate control valve 124, and a discharge-side stop valve 126 are connected. Note that, in the figure the supply-side poppet valve 121 and the discharge-side poppet valve 122 take the cut-off positions at which the circuit is cut off, and the valves are switched to the connection positions after being operated.

In the hydraulic cylinder 100, as the supply-side poppet valve 121 is switched to the connection position while the discharge-side poppet valve 122 remains at the cut-off position (illustrated position), the ram 102 of the hydraulic cylinder 100 moves up on account of the working hydraulic oil supplied to the pressure chamber 103, as the hydraulic oil discharge circuit 112 is disconnected. To move down the ram 102 of the hydraulic cylinder 100, the discharge-side poppet valve 122 is switched to the connection position. The rate of move up of the ram 102 is controlled by the flow rate control valve 123, whereas the rate of move down is controlled by the flow rate control valve 124.

Flushing of the hydraulic oil supply circuit 111, the hydraulic oil discharge circuit 122, and the hydraulic cylinder 100 is carried out in such a way that, as both of the supply-side poppet valve 121 and the discharge-side poppet valve 122 are switched to the connection positions, a circulation circuit of the discharged hydraulic oil from the hydraulic pump 110 is formed to connect the hydraulic oil supply circuit 111 with the hydraulic oil discharge circuit 112 and the tank 107 via the hydraulic cylinder 100 and therefore the hydraulic oil circulates in this supply/discharge circuit.

CITATION LIST

Patent Literature

[Patent Literature 1] Japanese Unexamined Patent Publication No. 2003-194009

SUMMARY OF INVENTION

Technical Problem

According to the flushing of the hydraulic cylinder drive circuit recited in Patent Literature 1 above, the following circulation operation is repeated: the hydraulic oil discharged from the hydraulic pump 110 is supplied from the supply-side poppet valve 121, the flow rate control valve 123, and the supply-side stop valve 125 of the hydraulic oil supply circuit 111 to the pressure chamber 103 of the hydraulic cylinder 100, the oil discharged from the pressure chamber 103 is returned to the tank 107 of the hydraulic oil via the discharge-side stop valve 126, the flow rate control valve 124, and the discharge-side poppet valve 122, and the hydraulic oil having returned the tank 107 of the hydraulic oil is filtrated by a filter.

The circulation operation for the flushing of the hydraulic cylinder drive circuit utilizes the hydraulic oil supply circuit 111 and the hydraulic oil discharge circuit 112 of the hydraulic cylinder 100. For this reason, the contaminants in the hydraulic cylinder 100 are simply allowed to pass through precision apparatuses for control such as the flow rate control valve 124 and the discharge-side poppet valve 122, with the result that the contaminants remain in the precision apparatuses so as to cause malfunction of the apparatuses and eventually malfunction of the hydraulic cylinder.

The present invention proposes a flushing circuit and a flushing method for avoiding malfunction of a control valve unit due to the biting of generated contaminants which often occurs in the flushing, by causing contaminated hydraulic oil in a hydraulic cylinder to return a tank of the hydraulic oil while bypassing the control valve unit including a direction switching valve which mainly controls the hydraulic cylinder, when the hydraulic cylinder drive circuit conducts flushing.

Solution to Problem

The present invention is characterized by including: a hydraulic pump connected to a tank of hydraulic oil to generate pressurized hydraulic oil; a hydraulic cylinder including a piston which slidably enters a cylinder main body and to which a piston rod is fixed and a head-side pressure chamber and a rod-side pressure chamber which are formed by the piston and the cylinder main body; a head-side in-valve supply/discharge circuit connected to the head-side pressure chamber, and having a head-side on-off valve; a rod-side in-valve supply/discharge circuit connected to the rod-side pressure chamber and having a rod-side on-off valve; a bypassing circuit having a bypass on-off valve being connected to the head-side in-valve supply/discharge circuit and the rod-side in-valve supply/discharge circuit at a side of the head-side on-off valve and the rod-side on-off valve opposite to the side connected to the hydraulic cylinder; a control valve unit including: an in-valve head-side supply/discharge circuit to which a head-side supply/discharge circuit which is connected to the head-side in-valve supply/discharge circuit is connected; an in-valve rod-side supply/discharge circuit to which a rod-side supply/discharge circuit which is connected to the rod-side in-valve supply/discharge circuit is connected; and a direction switching valve which switchably connects the in-valve head-side supply/discharge circuit and the in-valve rod-side supply/discharge circuit with the hydraulic pump and the tank; and a pump-side bypass circuit bypassing the control valve unit and including a pump-side stop valve which has an opening and closing function and connects a pump-side branch circuit branching from a pump discharge circuit of the hydraulic pump with the head-side supply/discharge circuit; and a tank-side bypass circuit bypassing the control valve unit and including a tank-side stop valve which has an opening and closing function and connects a tank-side branch circuit branching from a tank circuit connected to the tank with the rod-side supply/discharge circuit, wherein, a flushing circuit for returning discharge hydraulic oil of the hydraulic pump to the tank is constructed by the pump-side bypass circuit, the bypassing circuit, and the tank-side bypass circuit.

As described above, because a flushing circuit constituted by the head-side branch circuit and the bypass circuit and a flushing circuit constituted by the rod-side branch circuit and the bypass circuit is switchable by the direction switching valve of the control valve unit, the entirety of the circuit from the in-valve head-side supply/discharge circuit to the head-side branch circuit is cleaned as the hydraulic oil is supplied to the flushing circuit constituted by the head-side branch circuit and the bypass circuit. Similarly, the entirety of the circuit from the flushing circuit in-valve rod-side supply/discharge circuit constituted by the rod-side branch circuit and the bypass circuit to the rod-side branch circuit are cleaned. As such, the influence of contaminants on the control valve unit is removed by operating the flushing operation which is conducted in one direction by the direction switching valve.

A flushing circuit of the present invention is characterized by including: a hydraulic pump connected to a tank of hydraulic oil to generate pressurized hydraulic oil; a hydraulic cylinder including a piston which slidably enters a cylinder main body and to which a piston rod is fixed and a head-side pressure chamber and a rod-side pressure chamber which are formed by the piston and the cylinder main body; a head-side in-valve supply/discharge circuit connected to the head-side pressure chamber, and having a head-side on-off valve; a rod-side in-valve supply/discharge circuit connected to the rod-side pressure chamber and having a rod-side on-off valve; a bypassing circuit having a bypass on-off valve, which connects the head-side in-valve supply/discharge circuit with the rod-side in-valve supply/discharge circuit on the opposite side of the hydraulic cylinder with respect to the head-side on-off valve and the rod-side on-off valve; a control valve unit including: an in-valve head-side supply/discharge circuit to which a head-side supply/discharge circuit which is connected to the head-side in-valve supply/discharge circuit is connected; an in-valve rod-side supply/discharge circuit to which a rod-side supply/discharge circuit which is connected to the rod-side in-valve supply/discharge circuit is connected; and a direction switching valve which switchably connects the in-valve head-side supply/discharge circuit and the in-valve rod-side supply/discharge circuit with the hydraulic pump and the tank; wherein, the control valve unit includes: a pump-side bypass circuit including a pump-side stop valve which has an opening and closing function and connects a pump-side branch circuit branching from a pump discharge circuit of the hydraulic pump with the lowermost portion of the in-valve head-side supply/discharge circuit; and a tank-side bypass circuit including a tank-side stop valve which has an opening and closing function and connects a tank-side branch circuit branching from a tank circuit connected to the tank with the lowermost portion of the in-valve rod-side supply/discharge circuit, and wherein, a flushing circuit for returning discharge hydraulic oil of the hydraulic pump to the tank is constructed by the pump-side bypass circuit, the bypassing circuit, and the tank-side bypass circuit.

The flushing circuit of the present invention described above is arranged so that the control valve unit is bypassed by the pump-side bypass circuit, the bypassing circuit of the multifunction valve, and the tank-side bypass circuit. Therefore, in the flushing in which hydraulic oil discharged from the pump is caused to return the tank, the hydraulic oil discharged from the hydraulic pump returns the tank via the pump-side bypass circuit, the bypassing circuit multifunction valve, and the tank-side bypass circuit, while bypassing the control valve unit. Because the entirety of the hydraulic oil circulating for the flushing bypasses the control valve unit in this way, the contaminated hydraulic oil included in the returning hydraulic oil returns the tank via the tank-side bypass circuit, with the result that the control valve unit is protected from the contaminated hydraulic oil mixed in the hydraulic oil in the flushing circuit.

A flushing circuit of the present invention is characterized by including: a hydraulic pump connected to a tank of hydraulic oil to generate pressurized hydraulic oil; a hydraulic cylinder including a piston which slidably enters a cylinder main body and to which a piston rod is fixed and a head-side pressure chamber and a rod-side pressure chamber which are formed by the piston and the cylinder main body; a head-side in-valve supply/discharge circuit connected to the head-side pressure chamber and having a head-side on-off valve; a rod-side in-valve supply/discharge circuit connected to the rod-side pressure chamber and having a rod-side on-off valve; a bypassing circuit having a bypass on-off valve, which connects the head-side in-valve supply/discharge circuit with the rod-side in-valve supply/discharge circuit on the opposite side of the hydraulic cylinder with respect to the head-side on-off valve and the rod-side on-off valve; a control valve unit including: an in-valve head-side supply/discharge circuit to which a head-side supply/discharge circuit which is connected to the head-side in-valve supply/discharge circuit is connected; an in-valve rod-side supply/discharge circuit to which a rod-side supply/discharge circuit which is connected to the rod-side in-valve supply/discharge circuit is connected; and a direction switching valve which switchably connects the in-valve head-side supply/discharge circuit and the in-valve rod-side supply/discharge circuit with the hydraulic pump and the tank; a rod-side bypass circuit bypassing the control valve unit and including a pump-side valve which has an opening and closing function and connects a pump-side branch circuit branching from a pump discharge circuit of the hydraulic pump with the rod-side supply/discharge circuit; and a head-side bypass circuit bypassing the control valve unit and including a tank-side valve which has an opening and closing function and connects a tank-side branch circuit branching from a tank circuit connected to the tank with the head-side supply/discharge circuit, wherein, a flushing circuit for returning discharge hydraulic oil of the hydraulic pump to the tank is constructed by the head-side bypass circuit, the bypassing circuit, and the rod-side bypass circuit.

A flushing circuit of the present invention is characterized by including: a hydraulic pump connected to a tank of hydraulic oil to generate pressurized hydraulic oil; a hydraulic cylinder including a piston which slidably enters a cylinder main body and to which a piston rod is fixed and a head-side pressure chamber and a rod-side pressure chamber which are formed by the piston and the cylinder main body; a head-side in-valve supply/discharge circuit connected to the head-side pressure chamber, and having a head-side on-off valve; a rod-side in-valve supply/discharge circuit connected to the rod-side pressure chamber and having a rod-side on-off valve; a bypassing circuit having a bypass on-off valve, which connects the head-side in-valve supply/discharge circuit with the rod-side in-valve supply/discharge circuit on the opposite side of the hydraulic cylinder with respect to the head-side on-off valve and the rod-side on-off valve; a control valve unit including: an in-valve head-side supply/discharge circuit to which a head-side supply/discharge circuit which is connected to the head-side in-valve supply/discharge circuit is connected; an in-valve rod-side supply/discharge circuit to which a rod-side supply/discharge circuit which is connected to the rod-side in-valve supply/discharge circuit is connected; and a direction switching valve which switchably connects the in-valve head-side supply/discharge circuit and the in-valve rod-side supply/discharge circuit with the hydraulic pump and the tank; wherein, the control valve unit includes: a head-side bypass circuit including a pump-side stop valve which has an opening and closing function and connects a pump-side branch circuit branching from a pump discharge circuit of the hydraulic pump with the lowermost portion of the in-valve rod-side supply/discharge circuit; and a head-side bypass circuit including a tank-side stop valve which has an opening and closing function and connects a tank-side branch circuit branching from a tank circuit connected to the tank with the lowermost portion of the in-valve head-side supply/discharge circuit, and wherein, a flushing circuit for returning discharge hydraulic oil of the hydraulic pump to the tank is constructed by the head-side bypass circuit, the bypassing circuit, and the rod-side bypass circuit.

Advantageous Effects of Invention

A flushing circuit for a hydraulic cylinder drive circuit of the present invention is advantageous in that a control valve unit is protected from contaminants because hydraulic oil after flushing, which includes contaminants, returns a tank via a circuit bypassing a control valve unit including a direction switching valve.

DESCRIPTION OF EMBODIMENTS

Figure 1:
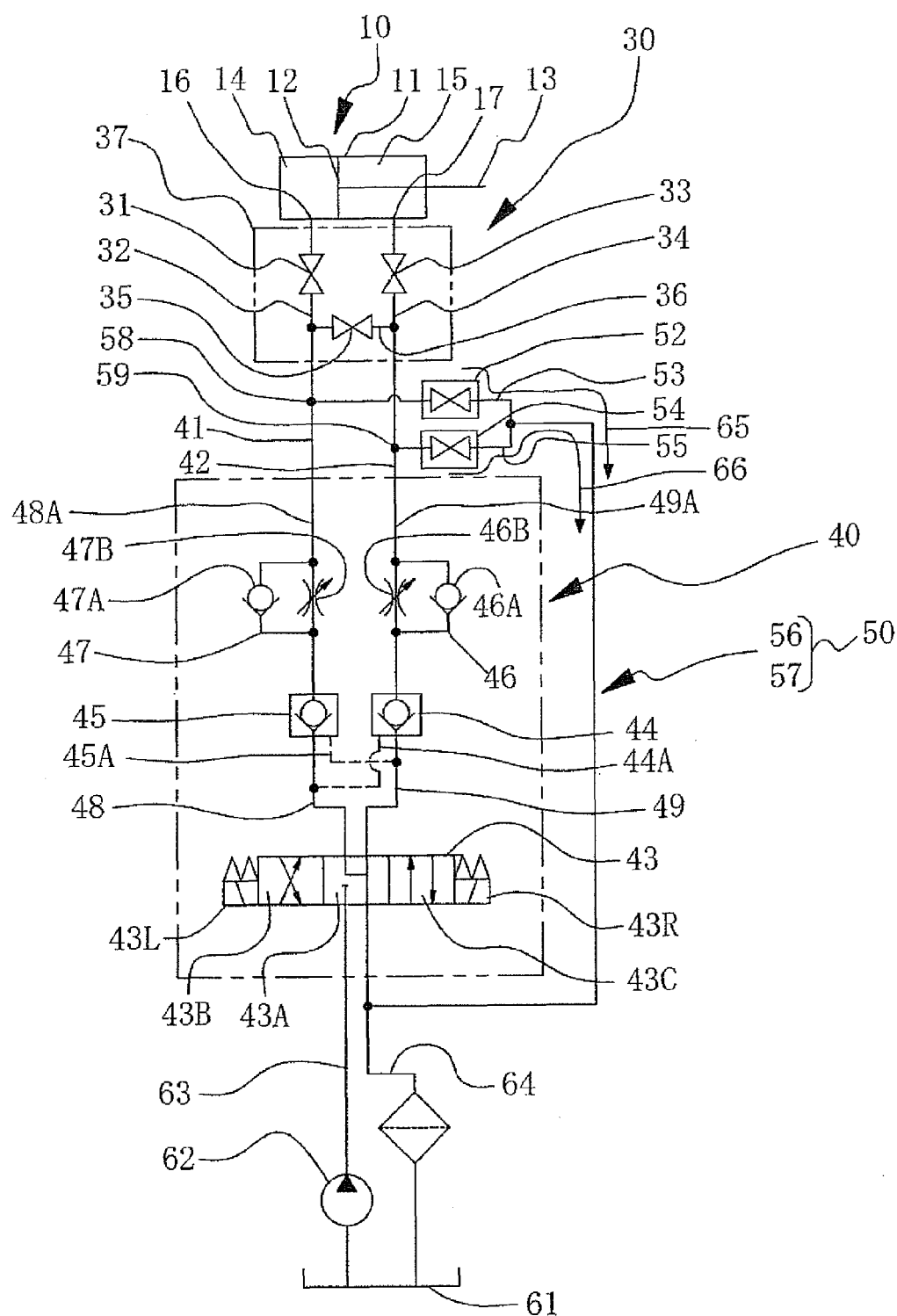
FIG. 1 shows a flushing circuit diagram of a hydraulic cylinder drive circuit of First Example of First Embodiment of the present invention.

The following will describe First Example of First Embodiment which is a preferred embodiment of the present invention, with reference to FIG. 1.

As shown in FIG. 1, a hydraulic cylinder 10 is constituted by a piston 12 that slidably enters a cylinder main body 11 with a seal being interposed therebetween and a piston rod 13 which is fixed to the piston 12 and protrudes to the outside of the cylinder main body 11 to be connected to a load. This piston 12 forms a head-side pressure chamber 14 and a rod-side pressure chamber 15 in the cylinder main body 11. As the pressurized hydraulic oil is supplied to the head-side pressure chamber 14 whereas the hydraulic oil in the rod-side pressure chamber 15 is discharged, the piston 12 and the rod 13 move toward the rod-side pressure chamber 15 on account of the hydraulic oil. On the other hand, as the pressurized hydraulic oil is supplied to the rod-side pressure chamber 15 and the hydraulic oil in the head-side pressure chamber 14 is discharged, the piston 12 and the rod 13 move toward the head-side pressure chamber 14 on account of the hydraulic pressure.

Although not detailed in the figure, a multifunction valve 30 for the hydraulic cylinder 10 is provided in the vicinity of the hydraulic cylinder 10, in order to minimize the size of the storage space of the hydraulic oil between the head-side pressure chamber 14 and the rod-side pressure chamber 15 of the hydraulic cylinder 10. That is to say, the valve 30 is directly connected to the head-side port 16 on the head-side pressure chamber 14 side where the output of the hydraulic cylinder 10 is high, in order to achieve pressure resistance, whereas connection is established to the rod-side port 17 by using a tube, where the pressure is relatively low. Alternatively, both of the head-side port 16 and the rod-side port 17 are connected via tubes with the multifunction valve 30 which is provided at the middle of the hydraulic cylinder 10.

In the valve main body 37, the multifunction valve 30 includes: a head-side in-valve supply/discharge circuit 32 which is connected to the head-side pressure chamber 14 via the head-side port 16 and is provided with a head-side on-off valve 31; a rod-side in-valve supply/discharge circuit 34 which is connected to the rod-side pressure chamber 15 via the rod-side port 17 and is provided with a rod-side on-off valve 33, and a bypassing circuit 36 which connects the head-side in-valve supply/discharge circuit 32 with the rod-side in-valve supply/discharge circuit 33 and is provided with a bypass on-off valve 35.

Each of the head-side on-off valve 31, the rod-side on-off valve 33, and the bypass on-off valve 35 of the multifunction valve 30 is an on-off valve in which a valve body is pressed onto a valve seat as a screw is rotated by a handle, a ball valve which is opened or closed by rotating a ball by a handle so that the direction of a hole made through the ball is changed, or the like. Each valve is structured so that the internal flow resistance is relatively low and the sealing force in the closed state is sufficient. Any other valve structures different from the above may be employed on condition that the flow resistance is lower than that of the control valve unit 40. Furthermore, although the head-side on-off valve 31, the rod-side on-off valve 33, and the bypass on-off valve 35 of this example may be manually or electrically operated, the flushing operation tends to be troublesome when the multifunction valve 30 is manually operated, because the operator is required to go over to the place where the hydraulic cylinder 10 is mounted. The flushing operation tends to be easy when the valve is electrically operated, because remote control is possible. The operation method is therefore selected in consideration of the frequency of the flushing operation.

The head-side on-off valve 31 and the rod-side on-off valve 33 of the multifunction valve 30 are provided to open or close the head-side in-valve supply/discharge circuit 32 and the rod-side in-valve supply/discharge circuit 34, and are used for, for example, measuring the leakage of the hydraulic cylinder 10 and the piston 12. That is to say, after the piston 12 is moved to the stroke end of the rod-side pressure chamber 15, the rod-side on-off valve 33 is closed so that the pressurized hydraulic oil is supplied from the head-side in-valve supply/discharge circuit 32 to the head-side pressure chamber 14. By measuring the leakage amount after predetermined period of time elapses in this state, the degree of damage to the seal of the piston 12 is measured. Alternatively, after the piston 12 is moved to the stroke end of the head-side pressure chamber 14, the head-side on-off valve 31 is closed so that the pressurized hydraulic oil is supplied from the rod-side in-valve supply/discharge circuit 34 to the rod-side pressure chamber 15. By measuring the leakage amount after a predetermined period of time elapses in this state, the degree of damage to the seal of the piston 12 is measured. Furthermore, the bypass on-off valve 35 has a function such that, as the head-side on-off valve 31 and the rod-side on-off valve 33 are closed to open the valve 35, the head-side in-valve supply/discharge circuit 32 is connected to the rod-side in-valve supply/discharge circuit 34 and hence the circuit blocked by the piston 12 of the hydraulic cylinder 10 is closed, with the result that a circulation circuit is constructed and the flushing becomes possible. Details of this function are described in Japanese Patent No. 3696850.

Figure 2:
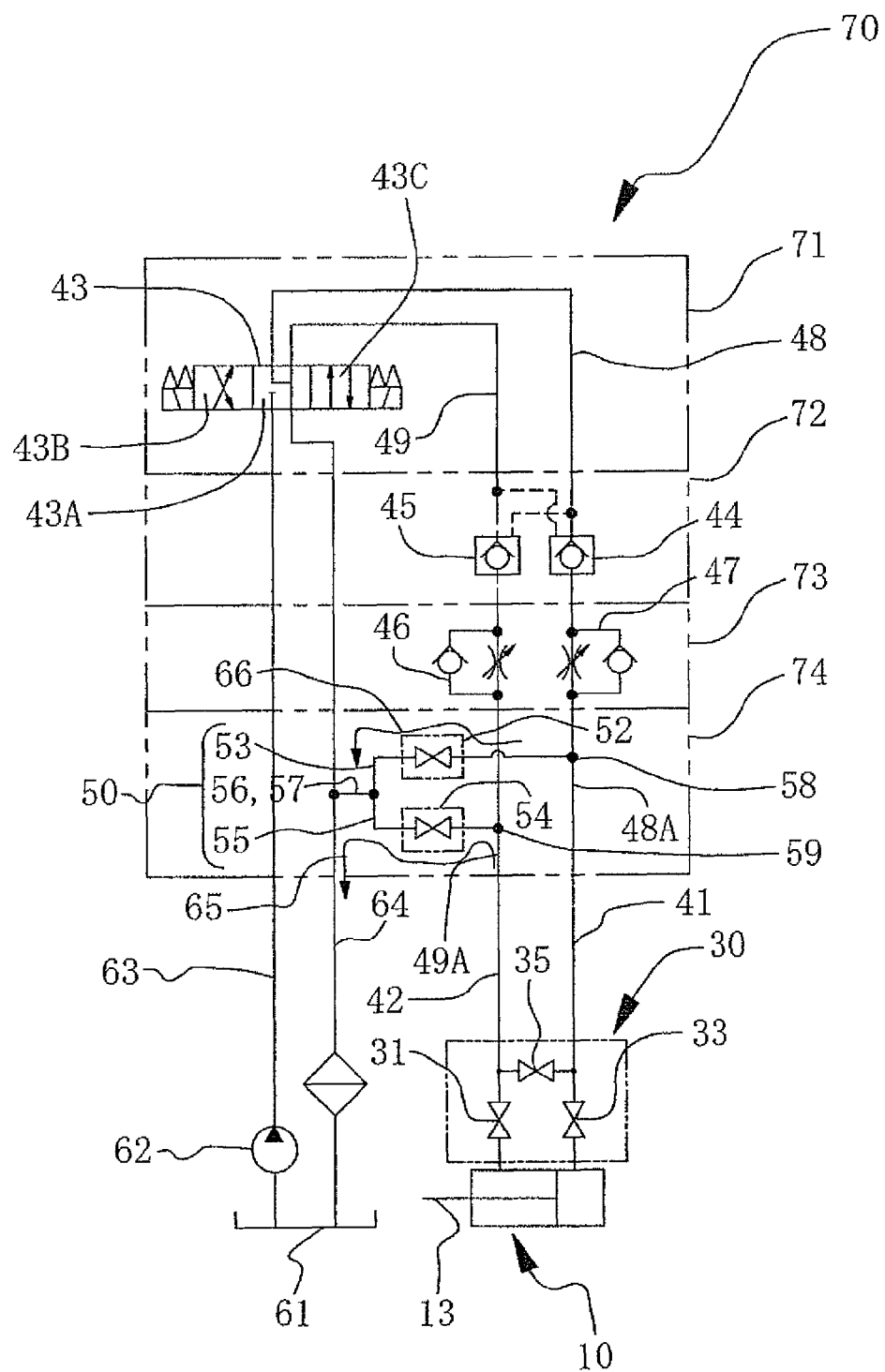
FIG. 2 shows a flushing circuit diagram of a hydraulic cylinder drive circuit of Second Example of First Embodiment.

The control valve unit 40 connected to the multifunction valve 30 via the head-side supply/discharge circuit 41 and the rod-side supply/discharge circuit 42 is constituted by speed control valves 46 and 47 adjusting the speed of the hydraulic cylinder 10 by meter-out control, pilot check valves 44 and 45 each of which is opened only when a pilot signal is supplied, and a direction switching valve 43 that controls the operating direction of the hydraulic cylinder 10. The number of types of the valves constituting the control valve unit 40 is changed in accordance with the type of the load driven by the hydraulic cylinder 10. Examples of such valves, which are not illustrated, include a counterbalance valve that prevents the hydraulic cylinder 10 from conducting unintentional movement and a relief valve that restricts the circuit pressure in accordance with the load. These types of valves are arranged in a manifold structure such that the valves are deposited as shown in FIG. 2 and the deposited valves are provided on a manifold or in a monocoque structure such that all components are built as a single integrated structure, and the valves having such a structure are provided in a hydraulic pressure source unit which is constituted by a hydraulic pump, a tank, and an operating unit.

The control valve unit 40 having a plurality of valves includes: a head-side supply/discharge circuit 48 which is provided in the valve unit, includes a lowermost circuit 48A connected to a head-side supply/discharge circuit 41, the speed control valve 47, and the pilot check valve 45 and is connected to the direction switching valve 43; a rod-side supply/discharge circuit 49 provided in the valve unit and is connected to the lowermost circuit 49A which is connected to the rod-side supply/discharge circuit 42, the speed control valve 46, and the pilot check valve 44; and the direction switching valve 43 which is connected on the downstream side to the head-side supply/discharge circuit 48 and the rod-side supply/discharge circuit 49 in the valve unit and is also connected on the upstream side to a tank 61 and a hydraulic pump 62 (the downstream side is equivalent to the hydraulic cylinder 10 side whereas the upstream side is equivalent to the tank 61 and hydraulic pump 62 side).

(Direction Switching Valve 43)

The direction switching valve 43 of the control valve unit 40 includes a neutral position 43A, a left changeover position 43B, a right changeover position 43C, and operating electromagnets 43L and 43R each having a neutral position returning spring. To the upstream of the valve 43 are connected a pump discharge circuit 63 connected to the discharge side of the hydraulic pump 62 and a tank circuit 64 connected to the tank 61, whereas to the upstream of the valve 43 are connected the head-side supply/discharge circuit 48 in the valve unit and the rod-side supply/discharge circuit 49 in the valve unit.

This direction switching valve 43 is, when the operating electromagnets 43L and 43R do not receive an operation instruction, positioned at the neutral position 43A where the pump discharge circuit 63 is disconnected and the head-side supply/discharge circuit 48 in the valve unit and the rod-side supply/discharge circuit 49 in the valve unit are connected to the tank circuit 64, on account of the neutral position returning spring in each electromagnet. As the operating electromagnet 43L receives the operation instruction, the left changeover position 43B is taken so that the pump discharge circuit 63 is connected to the rod-side supply/discharge circuit 49 in the valve unit and the head-side supply/discharge circuit 48 in the valve unit is connected to the tank circuit 64. In the meanwhile, as the operating electromagnet 43R receives the operation instruction, the right changeover position 43C is taken so that the pump discharge circuit 63 is connected to the rod-side supply/discharge circuit 48 in the valve unit and head-side supply/discharge circuit 49 in the valve unit is connected to the tank circuit 64.

When the direction switching valve 43 is kept at the neutral position 43A, the in-valve head-side supply/discharge circuit 48 and the in-valve rod-side supply/discharge circuit 49 are connected to the tank 61 via the tank circuit 64 and the pump discharge circuit 63 is disconnected. Therefore the pilot circuits 44A and 45A of the pilot check valves 44 and 45 become open to the tank circuit 64 and the pilot check valves 44 and 45 disconnect the in-valve head-side supply/discharge circuit 48 and the in-valve rod-side supply/discharge circuit 49.

When the direction switching valve 43 is switched to the left changeover position 43B, the pump discharge circuit 63 is connected to the in-valve rod-side supply/discharge circuit 49 and the in-valve head-side supply/discharge circuit 48 is connected to the tank circuit 64, with the result that the discharge hydraulic pressure of the hydraulic pump 62 is applied to the in-valve rod-side supply/discharge circuit 49 and this hydraulic pressure acts on the pilot circuit 45A so as to open the pilot check valve 45. Since the in-valve head-side supply/discharge circuit 48 is connected to the tank circuit 64, the rod 13 of the hydraulic cylinder 10 is moved inward.

When the direction switching valve 43 is switched to the right changeover position 43C, the pump discharge circuit 63 is connected to the in-valve rod-side supply/discharge circuit 48 and the in-valve head-side supply/discharge circuit 49 is connected to the tank circuit 64, with the result that the discharge hydraulic pressure of the hydraulic pump 62 is applied to the in-valve rod-side supply/discharge circuit 48 and this hydraulic pressure acts on the pilot circuit 44A so as to open the pilot check valve 44. Since the in-valve head-side supply/discharge circuit 49 is connected to the tank circuit 64, the rod 13 of the hydraulic cylinder 10 is moved outward.

In addition to the above, the speed control valve 46 of the in-valve rod-side supply/discharge circuit 49 is constituted by a check valve 46A blocking upstream flow and a variable throttle 46B provided to be in parallel to the check valve 46A. This speed control valve 46 is arranged to restrict only the flow from the downstream to the upstream (i.e., the flow on the discharge side of the hydraulic cylinder 10) and control the outbound speed of the hydraulic cylinder 10. Similarly, the speed control valve 47 of the in-valve rod-side supply/discharge circuit 48 is constituted by a check valve 47A blocking upstream flow and a variable throttle 47B provided to be in parallel to the check valve 47A. This speed control valve 47 is arranged to restrict only the flow from the downstream to the upstream (i.e., the flow on the discharge side of the hydraulic cylinder 10) and control the inbound speed of the hydraulic cylinder 10.

A bypass circuit 50 is constituted by a head-side branch circuit 53 which is connected to the tank circuit 64, includes the head-side stop valve 52, and is branched from the head-side supply/discharge circuit 41 and a rod-side branch circuit 55 which is connected to the tank circuit 64, includes the rod-side stop valve 54, and is branched from the rod-side supply/discharge circuit 42. This bypass circuit 50 forms a head-side selection bypass circuit 56 that opens the head-side stop valve 52 to connect the head-side branch circuit 53 with the tank circuit 64 and a rod-side selection bypass circuit 57 that opens the rod-side stop valve 54 to connect the rod-side supply/discharge circuit 42 with the tank circuit 64.

Each of the head-side stop valve 52 and the rod-side stop valve 54 is a stop valve in which a valve body is pressed onto a valve seat as a screw is rotated by a handle, a ball valve which is opened or closed by rotating a ball by a handle so that the direction of a hole made through the ball is changed, or the like. Each valve is structured so that the internal flow resistance is relatively low and the sealing force in the closed state is sufficient. While the head-side stop valve 52 and the rod-side stop valve 54 of the example may be manually or electrically operated, the valve is preferably electrically operated when the flushing is frequently done, because the valve is provided in the vicinity of the hydraulic pressure source to bypass the control valve unit 40. On the other hand, the valve is preferably manually operated when the flushing is infrequent. Furthermore, when the flushing is infrequent, the head-side stop valve 52 and the rod-side stop valve 54 of the bypass circuit are replaced with connectors (preferably self-sealing connectors as recited in Japanese Unexamined Patent Publication No. 2009-228899). Such connectors can function as the valves as the valves are opened and the bypass circuit is connected when the connectors are connected, whereas the valves are closed and the bypass circuit is disconnected as the connectors are disconnected.

While the branch part 58 between the head-side branch circuit 53 and the head-side supply/discharge circuit 41 is provided at the head-side supply/discharge circuit 41 between the control valve unit 40 and the multifunction valve 30, the branch part may be provided at the in-valve head-side supply/discharge circuit 48A connected to the head-side supply/discharge circuit 41. Similarly, while the branch part 59 between the rod-side branch circuit 55 and the rod-side supply/discharge circuit 42 is provided at the rod-side supply/discharge circuit 42 between the control valve unit 40 and the multifunction valve 30, the branch part may be provided at the in-valve rod-side supply/discharge circuit 49A.

Now, the operation in First Embodiment will be described. FIG. 1 shows that the hydraulic cylinder 10 is in idle state. In this state, the hydraulic oil contaminated (predominantly by cinders of the sealing of the hydraulic cylinder 10) is exhausted from the pressure chamber of the hydraulic cylinder and remains in the vicinity of the head-side in-valve supply/discharge circuit 32 and the rod-side in-valve supply/discharge circuit 34 of the multifunction valve 30.

In the state shown in FIG. 1, the head-side on-off valve 31 and the rod-side on-off valve 33 of the multifunction valve 30 are closed to open the bypass on-off valve 35 and connect the head-side supply/discharge circuit 41 with the rod-side supply/discharge circuit 42. Subsequently, as the direction switching valve 43 is switched to the left changeover position 43C, the pressurized hydraulic oil in the pump discharge circuit 63 flows through the direction switching valve 43 of the control valve unit 40, the in-valve head-side supply/discharge circuit 48, the in-valve head-side lowermost circuit 48A, the head-side supply/discharge circuit 41, the bypassing circuit 36 of the multifunction valve 30, the rod-side supply/discharge circuit 42, the rod-side stop valve 54, the rod-side branch circuit 55, and the rod-side selection bypass circuit 57, so that a counterclockwise flushing circuit 66 is formed by these components.

The hydraulic oil discharged from the hydraulic pump 62 at the time of the flushing of this counterclockwise flushing circuit 66 flows from the in-valve head-side supply/discharge circuit 48 to the head-side lowermost circuit 48A via the direction switching valve 43 of the control valve unit 40, and then passes through the head-side supply/discharge circuit 41 and reaches, via the rod-side supply/discharge circuit 42, the branch part 59, together with the hydraulic oil which remains around the multifunction valve 30 and is contaminated. In this regard, the hydraulic oil in the in-valve head-side supply/discharge circuit 48 is pressurized on account of the circuit resistances in the pilot check valve 45 and the speed control valve 47 so as to open the pilot check valve 44 via the pilot circuit 44A of the in-valve rod-side supply/discharge circuit 49. In this regard, the in-valve rod-side supply/discharge circuit 49 of the control valve unit 40 has a high flow resistance on account of the speed control valve 46, the pilot check valve 44, and the direction switching valve 43 therein, whereas the rod-side selection bypass circuit 57 has a low flow resistance on account of the rod-side stop valve 54. Because most of the contaminated hydraulic oil having reached the branch part 59 returns the tank via the rod-side selection bypass circuit 57, the control valve unit 40 makes it possible to minimize the influence of the contaminated hydraulic oil.

Similarly, in the state of FIG. 1, the head-side on-off valve 31 and the rod-side on-off valve 33 of the multifunction valve 30 are closed to open the bypass on-off valve 35 and connect the head-side supply/discharge circuit 41 with the rod-side supply/discharge circuit 42. Thereafter, as the direction switching valve 43 is switched to the right changeover position 43B, the pressurized hydraulic oil in the pump discharge circuit 63 flows into the direction switching valve 43 of the control valve unit 40, the in-valve head-side supply/discharge circuit 49, the in-valve head-side lowermost circuit 49A, the head-side supply/discharge circuit 42, the bypassing circuit 36 of the multifunction valve 30, the rod-side supply/discharge circuit 41, the head-side stop valve 52, the head-side branch circuit 53, and the head-side selection bypass circuit 56, with the result that a clockwise flushing circuit 65 is formed by these components.

The hydraulic oil discharged from the hydraulic pump 62 at the time of flushing of the clockwise flushing circuit 65 flows from the in-valve rod-side supply/discharge circuit 49 to the rod-side lowermost circuit 49A via the direction switching valve 43 of the control valve unit 40 and passes through the rod-side supply/discharge circuit 42 and then reaches, via the head-side supply/discharge circuit 41, the branch part 58, together with the contaminated hydraulic oil remaining around the multifunction valve 30. In this regard, the working hydraulic oil in the in-valve rod-side supply/discharge circuit 49 is pressurized by the circuit resistance of the pilot check valve 44 and the speed control valve 46 so as to open the pilot check valve 45 via the pilot circuit 45A of the in-valve rod-side supply/discharge circuit 49. In this regard, the in-valve head-side supply/discharge circuit 48 of the control valve unit 40 has a high flow resistance on account of the speed control valve 47, the pilot check valve 45, and the direction switching valve 43 therein, whereas the rod-side selection bypass circuit 56 has a low flow resistance on account of the resistance of the head-side stop valve 52. Because most of the contaminated hydraulic oil having reached the branch part 58 returns the tank via the rod-side selection bypass circuit 56, the control valve unit 40 makes it possible to minimize the influence of the contaminated hydraulic oil.

When the counterclockwise flushing circuit 66 including the rod-side selection bypass circuit 57 above and the clockwise flushing circuit 65 including the head-side selection bypass circuit 56 above operate, the hydraulic cylinder 10 is unlikely to move even if the head-side on-off valve 31 and the rod-side on-off valve 33 of the multifunction valve 30 are open, because the circuit resistance at the time of flushing is low. However, the head-side on-off valve 31 and the rod-side on-off valve 33 are preferably closed when it is required to certainly stop the movement of the hydraulic cylinder 10. Furthermore, it is possible to certainly close the in-valve head-side supply/discharge circuit 48 and the in-valve rod-side supply/discharge circuit 49 by increasing the operation pressures of the pilot check valve 45 and the pilot check valve 44 to prevent these valves from opening on account of the flow resistance generated at the time of the flushing of the clockwise flushing circuit 65 and the counterclockwise flushing circuit 66.

During the flushing by the counterclockwise flushing circuit 66, as the bypass stop valve 35 of the multifunction valve 30 is closed to open the head-side on-off valve 31 and the rod-side on-off valve 33, the hydraulic oil flows into the head-side pressure chamber 14 so as to push the rod of the hydraulic cylinder 10 outward. With this, the contaminated hydraulic oil stored in the rod-side pressure chamber 15 is exhausted to the rod-side supply/discharge circuit 42 and the flushing is carried out by opening the bypass on-off valve 35a again, with the result that the contaminated hydraulic oil in the rod-side pressure chamber 15 of the hydraulic cylinder 10 is exhausted.

Similarly, during the flushing by the clockwise flushing circuit 65, as the bypass on-off valve 35 of the multifunction valve 30 is closed to open the head-side on-off valve 31 and the rod-side on-off valve 33, the hydraulic oil flows into the rod-side pressure chamber 15 to draw the rod of the hydraulic cylinder 10 inward. With this, the contaminated hydraulic oil in the head-side pressure chamber 14 is exhausted to the head-side supply/discharge circuit 41 and the flushing is carried out by opening the bypass on-off valve 35 again, with the result that the contaminated hydraulic oil is exhausted from the head-side pressure chamber 14 of the hydraulic cylinder 10.

As such, during the flushing with the clockwise flushing circuit 65 or the counterclockwise flushing circuit 66 being formed, the contaminated hydraulic oil in the rod-side pressure chamber 15 and the head-side pressure chamber 14 of the hydraulic cylinder 10 is exhausted to the tank by closing the bypass on-off valve 35 of the multifunction valve 30, and hence the almost entirety of the drive circuit of the hydraulic cylinder 10 is flushed.

Now, Second Example of First Embodiment will be described with reference to FIG. 2. It is noted that the components denoted by the same reference numerals in First Example are substantially identically arranged and will not be explained again.

Second Example shown in FIG. 2 is different from First Example shown in FIG. 1 in that the control valve unit 40 is embodied as a specific laminated valve unit 70. This valve unit will be described below.

The laminated valve unit 70 is constructed by laminating and bolting a switching valve laminated valve unit 71 having the direction switching valve 43, a pilot-check laminated valve unit 72 having the pilot check valve 44 and the pilot check valve 45, a speed-control laminated valve unit 73 having the speed control valve 46 and the speed control valve 47, and a branch circuit laminated valve unit 74 provided with the head-side branch circuit 53 having the head-side stop valve 52 and the rod-side branch circuit 55 having the rod-side stop valve 54.

The pump discharge circuit 63 connected to the hydraulic pump 62 is connected to the upstream of the direction switching valve 43 of the switching valve laminated valve unit 71 via an internal path penetrating the laminated valve units of the laminated valve unit 70. Similarly, the tank circuit 64 connected to the tank 61 is connected to the upstream of the direction switching valve 43 of the switching valve laminated valve unit 71 via an internal path penetrating the above-described laminated valve units of the laminated valve unit 70.

To the downstream of the direction switching valve 43 are connected an in-valve rod-side supply/discharge circuit 49 connected to the pilot check valve 44 of the pilot-check laminated valve unit 72, the speed control valve 46 of the speed-control laminated valve unit 73, and the lowermost circuit 49A of the branch circuit laminated valve unit 74 and an in-valve rod-side supply/discharge circuit 48 connected to the pilot check valve 45 of the pilot-check laminated valve unit 72, the speed control valve 47 of the speed-control laminated valve unit 73, and the lowermost circuit 48A of the branch circuit laminated valve unit 74.

The in-valve head-side supply/discharge circuit 48 of the branch circuit laminated body 74 is connected to the head-side pressure chamber 14 of the hydraulic cylinder 10 via the head-side supply/discharge circuit 41 and the multifunction valve 30, whereas the in-valve rod-side supply/discharge circuit 49 of the branch circuit laminated body 74 is connected to the rod-side pressure chamber 15 of the hydraulic cylinder 10 via the rod-side supply/discharge circuit 42 and the multifunction valve 30.

Furthermore, in the branch circuit laminated body 74, the lowermost circuit 48A is connected to the tank circuit 64 in the branch circuit laminated body 74 via the head-side branch circuit 53 having the head-side valve 52 and the lowermost circuit 49A is connected to the tank circuit 64 via the rod-side branch circuit 55 having the rod-side valve 54.

In Second Example, in a similar manner as First Example, the flushing of the discharge hydraulic oil of the pump discharge circuit 63 is carried out in such a way that, after the head-side on-off valve 31 and the rod-side on-off valve 33 of the multifunction valve 30 are closed to open the bypass on-off valve 35 and the head-side stop valve 52 is opened and the rod-side stop valve 54 is closed, the clockwise flushing circuit 65 is formed as the direction switching valve 43 is switched to the left changeover position 43C. Furthermore, the flushing of the discharge hydraulic oil of the pump discharge circuit 63 is carried out in such a way that, after the head-side on-off valve 31 and the rod-side on-off valve 33 of the multifunction valve 30 are closed to open the bypass on-off valve 35 and the head-side stop valve 54 is opened and the rod-side stop valve 52 is closed, the clockwise flushing circuit 65 is formed as the direction switching valve 43 is switched to the left changeover position 43B. Furthermore, as during this flushing the bypass on-off valve 35 is closed and the head-side on-off valve 31 and the head-side in-valve supply/discharge circuit 32 are opened, the rod 13 of the hydraulic cylinder 10 is pushed outward during the clockwise flushing, whereas the rod 13 of the hydraulic cylinder 10 is drawn inward during the counterclockwise flushing. The flushing of the pressure chamber of the hydraulic cylinder 10 is achieved by suitably utilizing this operation and clockwise or counterclockwise flushing.

Second Example exhibits an effect such that, because all functions are concentrated on the laminated valve unit 70, the lengths of the clockwise flushing circuit 65 and the counterclockwise flushing circuit 66 (the total length of the head-side supply/discharge circuit 41 and the rod-side supply/discharge circuit 42) are maximized.

Now, First Example of Second Embodiment will be described with reference to FIG. 3. It is noted that the components denoted by the same reference numerals in the examples of First Embodiment are substantially identically arranged and will not be explained again.

The following will describe differences between First Embodiment and Second Embodiment. In First Embodiment, the clockwise flushing circuit 65 and the counterclockwise flushing circuit 66 are formed by the shared bypass circuit 50, and the hydraulic oil discharged from the pressure pump 62 is supplied by the operation of the direction switching valve 43 and only the returning hydraulic oil returns the tank via the bypass circuit 50. The control valve unit is protected from the contaminants in this way. In comparison with First Embodiment arranged as above, Second Embodiment protects the control valve unit from the contaminants at the time of the flushing by completely bypassing the control valve unit in such a way that a flushing circuit is formed by the hydraulic-pump-side bypass circuit and the tank-side bypass circuit.

First Example of Second Embodiment will be described with reference to FIG. 3. The pump-side bypass circuit 50A bypassing the control valve unit 40 is formed by a head-side branch circuit 53A branching from the head-side supply/discharge circuit 41 of the control valve unit 40 (or the head-side lowermost circuit 48A) and a pump-side stop valve 52A which branches from the pump discharge circuit 63 connected to the hydraulic pump 62, is connected to a pump-side branch circuit 63A, and is arranged to be able to open and close.

Furthermore, a tank-side bypass circuit 503 bypassing the control valve unit 40 is formed by a rod-side branch circuit 55A branching from the rod-side supply/discharge circuit 42 (or the rod-side lowermost circuit 49A) and a tank-side stop valve 54A which is connected to the tank-side branch circuit 64A connected to the tank circuit 64 and is arranged to be able to open and close.

Furthermore, although not illustrated, the pump-side bypass circuit 50A may alternatively be a pump-side bypass circuit 50C whose head-side branch circuit 53A is connected to either the rod-side lowermost circuit 49A or the rod-side supply/discharge circuit 42. Furthermore, the tank-side bypass circuit 50B may alternatively be a tank-side bypass circuit 50D whose rod-side branch circuit 55A is connected to either the head-side lowermost circuit 48A or the head-side supply/discharge circuit 41.

Figure 3:
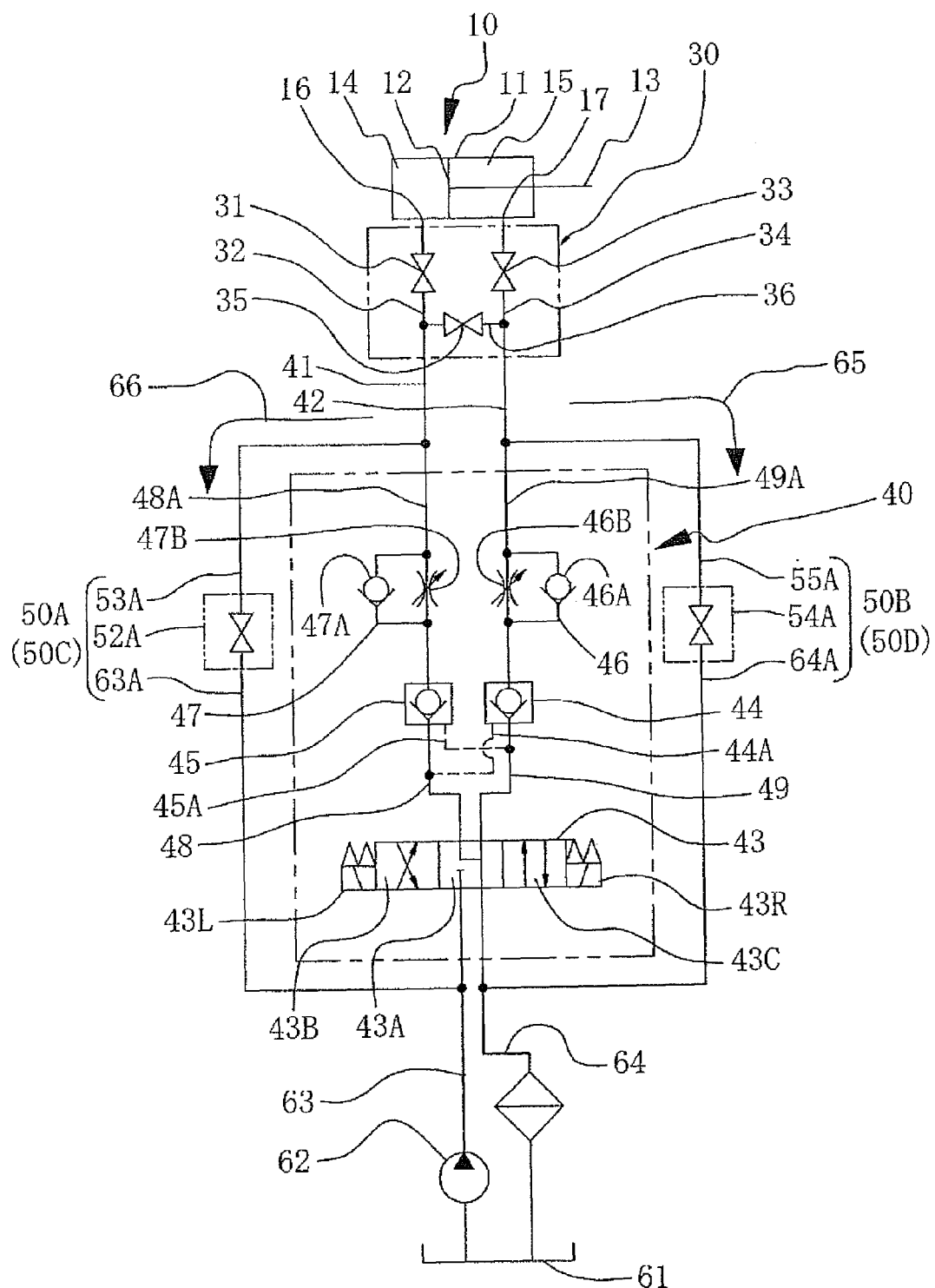
FIG. 3 shows a flushing circuit diagram of the hydraulic cylinder drive circuit of First Example of Second Embodiment of the present invention.

In FIG. 3, as the pump-side stop valve 52A of the pump-side bypass circuit 50A, the bypass on-off valve 35 of the multifunction valve 30, and the tank-side stop valve 54A of the tank-side bypass circuit 50B are opened, in the hydraulic pump 62 the pump discharge circuit 63 is connected to the tank 61 via the pump-side bypass circuit 50A, the head-side supply/discharge circuit 41, the bypassing circuit 36 of the multifunction valve 30, the rod-side supply/discharge circuit 42, the tank-side bypass circuit 50B, and the tank circuit 64, so that the clockwise flushing circuit 65 is formed.

Furthermore, although not illustrated in FIG. 3, as the pump-side stop valve 52A of the pump-side bypass circuit 50C, the bypass on-off valve 35 of the multifunction valve 30, and the tank-side stop valve 54A of the tank-side bypass circuit 50D are opened, the hydraulic pump 62 is connected to the tank 61 via the pump discharge circuit 63, the pump-side bypass circuit 50A, the rod-side supply/discharge circuit 42, the bypassing circuit 36 of the multifunction valve 30, the head-side supply/discharge circuit 41, the tank-side bypass circuit 50D, and the tank circuit 64, with the result that the counterclockwise flushing circuit 66 is formed.

On the clockwise flushing circuit 65 and the counterclockwise flushing circuit 66, only the flow resistances of the three valves, i.e., the tank-side stop valve 54A, the bypass on-off valve 35, and the tank-side stop valve 54A work, apart from the pipe resistance. On this account, the hydraulic cylinder 10 is unlikely to move even if the head-side on-off valve 31 and the rod-side on-off valve 33 of the multifunction valve 30 are open. If the hydraulic cylinder 10 moves, at least one of the head-side on-off valve 31 and the rod-side on-off valve 33 is closed.

In the clockwise flushing circuit 65 above, the resistances working on the tank-side bypass circuit 50B where the hydraulic oil returns are only the pipe resistances of the pipes constituting the circuit and the flow resistance of the tank-side stop valve 54A. On this account, this flow resistance is lower than the flow resistance in the control valve unit 40 which includes precision apparatuses such as the direction switching valve 43. Similarly, in the counterclockwise flushing circuit 66, the resistances working on the pump-side bypass circuit 50A where the hydraulic oil returns are only the pipe resistances of the pipes constituting the circuit and the flow resistance of the tank-side stop valve 52A. On this account, this flow resistance is lower than the flow resistance in the control valve unit 40 which includes precision apparatuses such as the direction switching valve 43.

In addition to the above, as shown in FIG. 3 of First Example, when the flushing is carried out with the clockwise flushing circuit 65 being constructed, as the bypass on-off valve 35 of the multifunction valve 30 is closed and the head-side stop valve 31 and the rod-side on-off valve 33 are opened, the rod 13 of the hydraulic cylinder 10 is moved outward. With this operation, the contaminated hydraulic oil of the rod-side pressure chamber 15 of the hydraulic cylinder 10 is exhausted to the rod-side supply/discharge circuit 42, and the bypass on-off valve 35 is closed again and the flushing is carried out. Similarly, when the flushing is carried out with the counterclockwise flushing circuit 66 being constructed, as the bypass on-off valve 35 of the multifunction valve 30 is closed and the head-side on-off valve 31 and the rod-side on-off valve 33 are opened, the rod 13 of the hydraulic cylinder 10 is moved inward. With this operation, the contaminated hydraulic oil in the head-side pressure chamber 14 of the hydraulic cylinder 10 is exhausted to the head-side supply/discharge circuit 41, and the bypass on-off valve 35 is closed again and the flushing is carried out. With the operations above, the flushing of the hydraulic cylinder 10 is achieved.

Now, the operation of First Example will be described. In FIG. 3, the clockwise flushing circuit 65 is formed, and hydraulic oil discharged from the hydraulic pump 62 reaches the branch part 59 via the pump-side bypass circuit 50A, the head-side supply/discharge circuit 41, and the bypassing circuit 36. Because the in-valve rod-side supply/discharge circuit 49 is closed by the pilot check valve 44, the hydraulic oil returns the tank 61 via the tank-side bypass circuit 50B and the flushing is carried out. Note that, while in the example shown in FIG. 3 the pilot check valve 45 is provided at the in-valve head-side supply/discharge circuit 48, the pilot check valve 44 is provided at the in-valve rod-side supply/discharge circuit 49, and the in-valve rod-side supply/discharge circuit 49 and the in-valve head-side supply/discharge circuit 48 are closed, almost entirety of the hydraulic oil returns via the tank-side bypass circuit 50B even if the pilot check valve 44 and the pilot check valve 45 are not provided, because the flow resistance of the tank-side bypass circuit 50B is lower than the flow resistance of the control valve unit 40. The counterclockwise flushing circuit 66 will not be explained because its structure is substantially identical with the structure of the clockwise flushing circuit 65.

Now, Second Example will be described with reference to FIG. 4. It is noted that the components denoted by the same reference numerals in the examples of First Embodiment and First Example are substantially identically arranged and will not be explained again.

Figure 4:
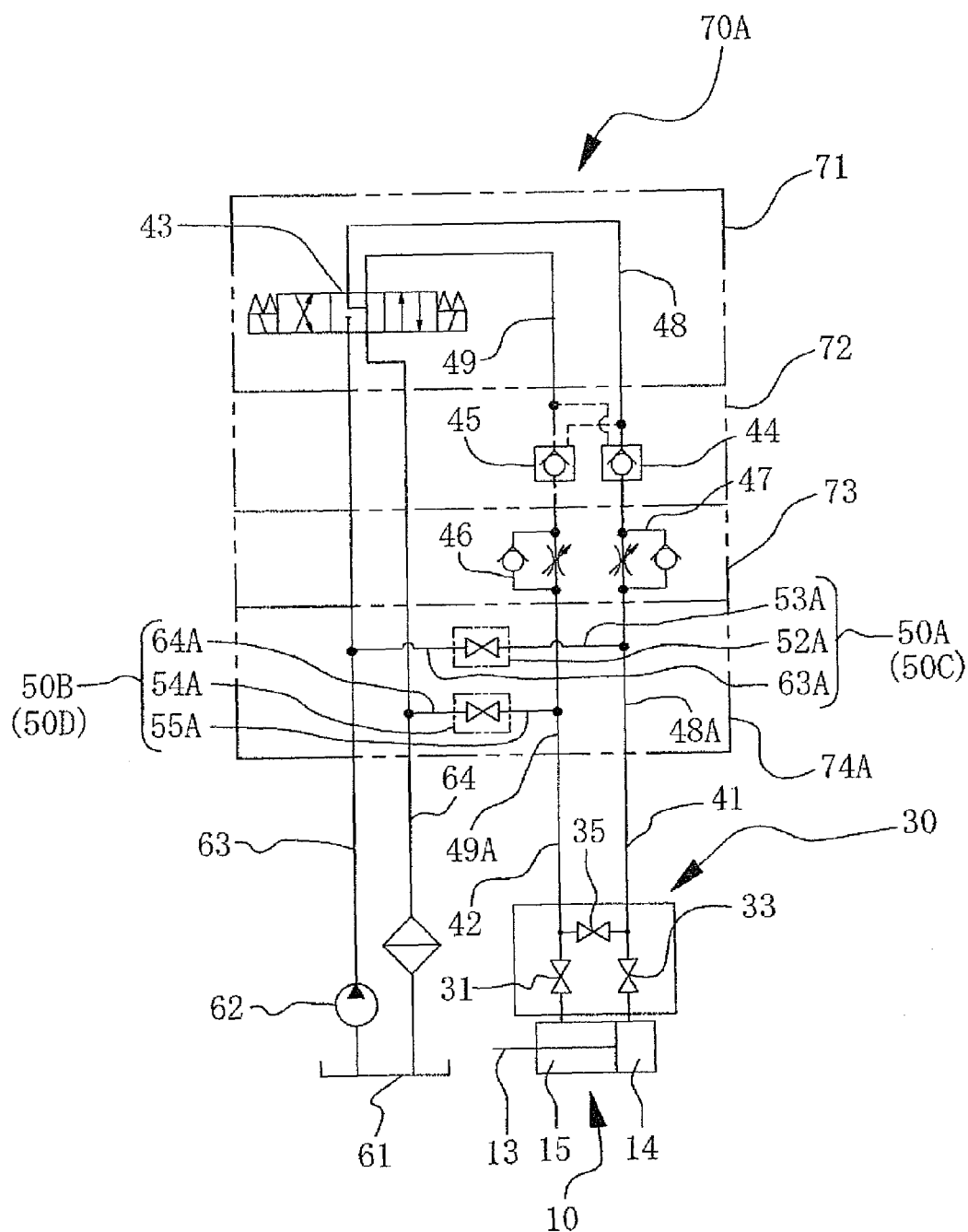
FIG. 4 shows a flushing circuit diagram of the hydraulic cylinder drive circuit of Second Example of Second Embodiment.

Second Example shown in FIG. 4 is different from First Example shown in FIG. 3 in that the control valve unit 40 is embodied as a specific laminated valve unit 70A. This valve unit will be described below.

The laminated valve unit 70A is constructed by laminating and bolting the switching valve laminated valve unit 71 having the direction switching valve 43, the pilot-check laminated valve unit 72 having the pilot check valve 44 and the pilot check valve 45, the speed-control laminated valve unit 73 having the speed control valve 46 and the speed control valve 47, and a branch circuit laminated valve unit 74A provided with the head-side branch circuit 53 having the head-side stop valve 52 and the rod-side branch circuit 55 having the rod-side stop valve 54.

The pump discharge circuit 63 connected to the hydraulic pump 62 is connected to the upstream of the direction switching valve 43 of the switching valve laminated valve unit 71 via an internal path penetrating the laminated valve units of the laminated valve unit 70A. Similarly, the tank circuit 64 connected to the tank 61 is connected to the upstream of the direction switching valve 43 of the switching valve laminated valve unit 71 via an internal path penetrating the above-described laminated valve units of the laminated valve unit 70.

To the downstream of the direction switching valve 43 are connected: an in-valve rod-side supply/discharge circuit 49 connected to the pilot check valve 44 of the pilot-check laminated valve unit 72, the speed control valve 46 of the speed-control laminated valve unit 73, and the lowermost circuit 49A of the branch circuit laminated valve unit 74A; and an in-valve rod-side supply/discharge circuit 48 connected to the pilot check valve 45 of the pilot-check laminated valve unit 72, the speed control valve 47 of the speed-control laminated valve unit 73, and the lowermost circuit 48A of the branch circuit laminated valve unit 74A.

The in-valve head-side supply/discharge circuit 48 of the branch circuit laminated valve unit 74A is connected with the head-side pressure chamber 14 of the hydraulic cylinder 10 via the head-side lowermost circuit 48A, the head-side supply/discharge circuit 41, and the multifunction valve 30. Furthermore, the in-valve rod-side supply/discharge circuit 49 of the branch circuit laminated valve unit 74A is connected to the rod-side pressure chamber 15 of the hydraulic cylinder 10 via the rod-side lowermost circuit 49A, the rod-side supply/discharge circuit 42, and the multifunction valve 30.

Furthermore, in the branch circuit laminated valve unit 74A are provided: a pump-side bypass circuit 50A constituted by a head-side branch circuit 53A branching from the in-valve head-side supply/discharge circuit 48 and a pump-side stop valve 52A connected to a tank-side branch circuit 6421 branching from the tank circuit 64; and a tank-side stop valve 54A to which a rod-side branch circuit 55A branching from the in-valve rod-side supply/discharge circuit 49 and the tank-side branch circuit 64A branching from the tank circuit 64 are connected. Being similar to First Example, the clockwise flushing circuit 65 and the counterclockwise flushing circuit 66 are constructed such that the pump-side bypass circuit 50A is replaced with the pump-side bypass circuit 50C and the tank-side bypass circuit 50B is replaced with the tank-side bypass circuit 50D.

The operation of Second Example is, in the same manner as First Example, such that the clockwise flushing circuit 65 is formed as the bypass on-off valve 35 of the multifunction valve 30, the tank-side stop valve 54A, and the pump-side stop valve 52A are opened. As discharge hydraulic oil is supplied from the hydraulic pump 62 to the clockwise flushing circuit 65, the hydraulic oil returns the tank 61 via the pump discharge circuit 63, the pump-side bypass circuit 50A, the head-side lowermost circuit 48A, the head-side supply/discharge circuit 41, the bypassing circuit 36 of the multifunction valve 30, the rod-side supply/discharge circuit 42, the tank-side bypass circuit 50B, and the tank circuit 64. In this way, the clockwise flushing is achieved by causing the discharge hydraulic oil of the hydraulic pump 62 to circulate in the clockwise flushing circuit 65.

Because the counterclockwise flushing circuit 66 is constructed by using the pump-side bypass circuit 50C and the tank-side bypass circuit 50D, the counterclockwise flushing is achieved by causing the hydraulic oil of the hydraulic pump 62 to circulate in the counterclockwise flushing circuit 66. When the bypassing circuit 36 of the multifunction valve 30 is closed and the head-side stop valve 31 and the rod-side on-off valve 33 are opened during the clockwise flushing or the counterclockwise flushing, the hydraulic cylinder 10 is operated. For this reason, the flushing of the hydraulic cylinder 10 may be achieved by combining the operation of the hydraulic cylinder 10 with the flushing operation, in the same manner as in First Example.

Second Example achieves downsizing because all functions are concentrated on the laminated valve unit 70A, and the length of the flushing circuit (i.e., the total length of the head-side supply/discharge circuit 41 and the rod-side supply/discharge circuit 42) is maximized, because the tank-side bypass circuit 50B and the pump-side bypass circuit 50A are constructed inside the branch circuit laminated valve unit 74A.

Now, First Example of Third Embodiment will be described with reference to FIG. 5. It is noted that the components denoted by the same reference numerals in First Embodiment are substantially identically arranged and will not be explained again.

The following will describe differences between Second Embodiment and Third Embodiment. Because Second Embodiment is arranged to construct the clockwise flushing circuit 65 and the counterclockwise flushing circuit 66 as stationary circuits, it is impossible in the finished product to select one of the clockwise flushing circuit 65 and the counterclockwise flushing circuit 66. In this regard, Third Embodiment is arranged so that one of the counterclockwise flushing circuit 66 and the clockwise flushing circuit 65 is selectable.

First Example of Third Embodiment will be described with reference to FIG. 5. A head-side bypass circuit 56A bypassing the control valve unit 40 is constituted by: a head-side branch circuit 53A branching from the head-side supply/discharge circuit 41 of the control valve unit 40 (or the head-side lowermost circuit 48A), a pump-side branch circuit 63B branching from the pump discharge circuit 63 connected to the hydraulic pump 62; and a head-side valve 52E which is connected to the tank circuit 64B branching from the tank circuit 64 and includes a pump-side stop valve 52B connecting/disconnecting the head-side branch circuit 53A to/from the pump-side branch circuit 63B and a rod-side valve 54B connecting/disconnecting the head-side branch circuit 53A to/from the tank circuit 64B.

A rod-side bypass circuit 57A bypassing the control valve unit 40 is constituted by: a rod-side branch circuit 55A branching from the rod-side supply/discharge circuit 42 of the control valve unit 40, a pump-side branch circuit 63C branching from the pump discharge circuit 63 connected to the hydraulic pump 62; and a rod-side stop valve 54E which is connected to the tank-side branch circuit 64C branching from the tank circuit 64 and includes a pump-side stop valve 52C connecting/disconnecting the rod-side branch circuit 55A to/from the pump-side branch circuit 63C and a tank-side stop valve 54C connecting/disconnecting the rod-side branch circuit 55A to/from the tank-side branch circuit 64C.

The clockwise flushing circuit 65 is formed by a pump-side bypass circuit 50A in which the head-side branch circuit 53A of the head-side bypass circuit 56A is connected with the pump-side branch circuit 63B at the tank-side stop valve 52B and a tank-side bypass circuit 50D in which the rod-side branch circuit 55A of the rod-side bypass circuit 57A is connected with the tank-side branch circuit 64C at the tank-side stop valve 54C.

The counterclockwise flushing circuit 66 is formed by a pump-side bypass circuit 50C in which the rod-side branch circuit 55A of the rod-side bypass circuit 57A is connected with the pump-side branch circuit 63C at the pump-side stop valve 52C and a tank-side bypass circuit 50B in which the head-side branch circuit 53A of the head-side bypass circuit 56A is connected with the pump-side branch circuit 63C at the pump-side stop valve 52C.

On the clockwise flushing circuit 65, only the flow resistances of the three valves, i.e., the tank-side stop valve 52B, the bypass stop valve 35, and the tank-side stop valve 54C work, apart from the pipe resistance. On this account, the hydraulic cylinder 10 is unlikely to move even if the head-side on-off valve 31 and the rod-side on-off valve 33 of the multifunction valve 30 are open. Similarly, on the counterclockwise flushing circuit 66, only the flow resistances of the three valves, i.e., the pump-side stop valve 52C, the bypass on-off valve 35, and the tank-side stop valve 54B work, apart from the pipe resistance. On this account, the hydraulic cylinder 10 is unlikely to move even if the head-side on-off valve 31 and the rod-side on-off valve 33 of the multifunction valve 30 are open. If the hydraulic cylinder 10 moves, at least one of the head-side stop valve 31 and the rod-side on-off valve 33 is closed.

In the clockwise flushing circuit 65 above, the resistances working on the rod-side bypass circuit 57A where the hydraulic oil returns are only the pipe resistances of the pipes constituting the circuit and the flow resistance of the tank-side stop valve 54C. On this account, this flow resistance is lower than the flow resistance in the control valve unit 40 which includes precision apparatuses such as the direction switching valve 43. Similarly, in the counterclockwise flushing circuit 66, the resistances working on the head-side bypass circuit 56A where the hydraulic oil returns are only the pipe resistances of the pipes constituting the circuit and the flow resistance of the tank-side stop valve 54C. On this account, this flow resistance is lower than the flow resistance in the control valve unit 40 which includes precision apparatuses such as the direction switching valve 43.

Now, the operation of First Example of Third Embodiment will be described. In FIG. 5, the pump-side stop valve 52B of the head-side bypass circuit 56A is opened so that a pump-side bypass circuit 50A is constructed in the head-side bypass circuit 56A, whereas the tank-side stop valve 54C of the rod-side bypass circuit 57A is opened so that a tank-side bypass circuit 50D is constructed in the rod-side bypass circuit 57A. Then the bypass on-off valve 35 of the multifunction valve 30 is opened, with the result that the discharge hydraulic oil of the hydraulic pump 62 circulates in the clockwise flushing circuit 65.

As the discharge hydraulic oil of the hydraulic pump 62 is supplied to this clockwise flushing circuit 65', the hydraulic oil reaches the pump discharge circuit 63, the head-side bypass circuit 56A, the head-side supply/discharge circuit 41, the bypassing circuit 36, the rod-side supply/discharge circuit 42, and the rod-side bypass circuit 57A. In this regard, because the in-valve rod-side supply/discharge circuit 49 is closed by the pilot check valve 44, the oil returns the tank 61 via the tank-side bypass circuit 50B and the flushing is conducted.

Figure 5:
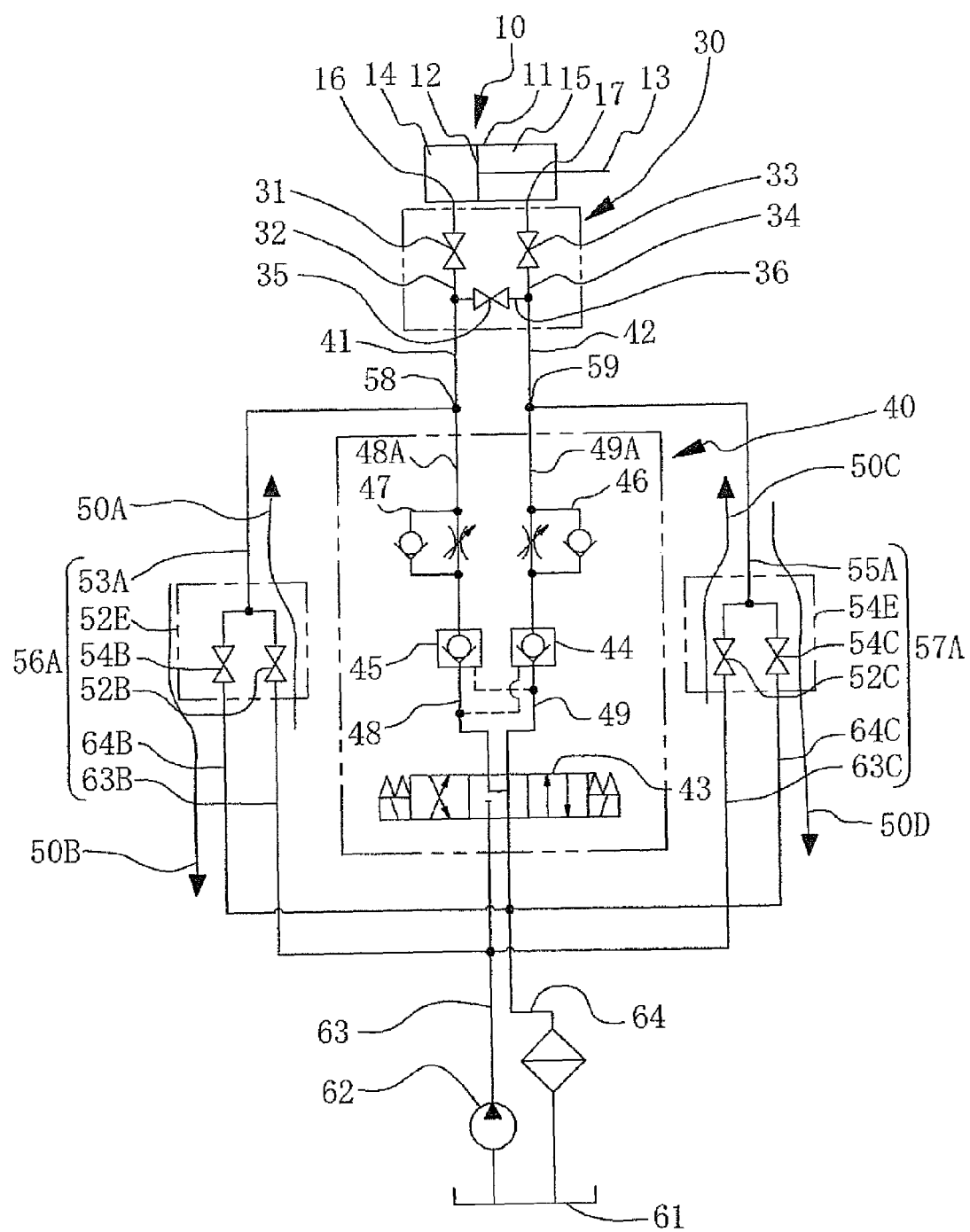
FIG. 5 shows a flushing circuit diagram of a hydraulic cylinder drive circuit of First Example of Third Embodiment of the present invention.

While in the example shown in FIG. 5 the in-valve head-side supply/discharge circuit 48 is closed by the pilot check valve 44, even if the pilot check valve 44 is not provided, almost entirety of the hydraulic oil returns via the rod-side bypass circuit 57A because the flow resistance of the rod-side bypass circuit 57A is lower than the flow resistance of the control valve unit 40.

In FIG. 5, a tank-side bypass circuit 50D is constructed in the head-side bypass circuit 56A by opening the pump-side stop valve 52B of the head-side bypass circuit 56A, and a head-side bypass circuit 50C is constructed in the rod-side bypass circuit 57A by opening the pump-side stop valve 52C of the rod-side bypass circuit 57A. Then, as the bypass on-off valve of the multifunction valve 30 is opened, the counterclockwise flushing circuit 66 is formed.

As the discharge hydraulic oil of the hydraulic pump 62 is supplied to this counterclockwise flushing circuit 66, the hydraulic oil reaches the pump discharge circuit 63, the rod-side bypass circuit 57A, the rod-side supply/discharge circuit 42, the bypassing circuit 36, the head-side supply/discharge circuit 41, and the head-side bypass circuit 56A. Because the in-valve head-side supply/discharge circuit 48 is closed by the pilot check valve 45, the oil returns the tank 61 via the tank-side bypass circuit 50B constructed in the head-side bypass circuit 56A, and the flushing is conducted.

In the example shown in FIG. 5, the in-valve rod-side supply/discharge circuit 49 is closed by the pilot check valve 45. However, even if the pilot check valve 45 is not provided, almost entirety of the hydraulic oil returns via the rod-side bypass circuit 57A because the flow resistance of the tank-side bypass circuit 50B in the head-side bypass circuit 56A is lower than the flow resistance of the control valve unit 40.

When the flushing is carried out with the clockwise flushing circuit 65 being formed, as the bypass on-off valve 35 of the multifunction valve 30 is closed and the head-side on-off valve 31 and the rod-side on-off valve 33 are opened, the rod 13 of the hydraulic cylinder 10 is moved outward. As a result of this operation, the contaminated hydraulic oil in the rod-side pressure chamber 15 of the hydraulic cylinder 10 is exhausted to the rod-side supply/discharge circuit 42, and the bypass stop valve 35 is closed again and the flushing is conducted.

Similarly, when the flushing is carried out with the counterclockwise flushing circuit 66 being constructed, as the bypass on-off valve 35 of the multifunction valve 30 is closed and the head-side on-off valve 31 and the rod-side on-off valve 33 are opened, the rod 13 of the hydraulic cylinder 10 is moved inward. With this operation, the contaminated hydraulic oil in the head-side pressure chamber 14 of the hydraulic cylinder 10 is exhausted to the head-side supply/discharge circuit 41, and the bypass on-off valve 35 is closed again and the flushing is carried out. As such, the flushing of the hydraulic cylinder 10 is conducted.

Now, Second Example of Third Embodiment will be described with reference to FIG. 6. It is noted that the components denoted by the same reference numerals in Second Embodiment are substantially identically arranged and will not be explained again.

Figure 6:
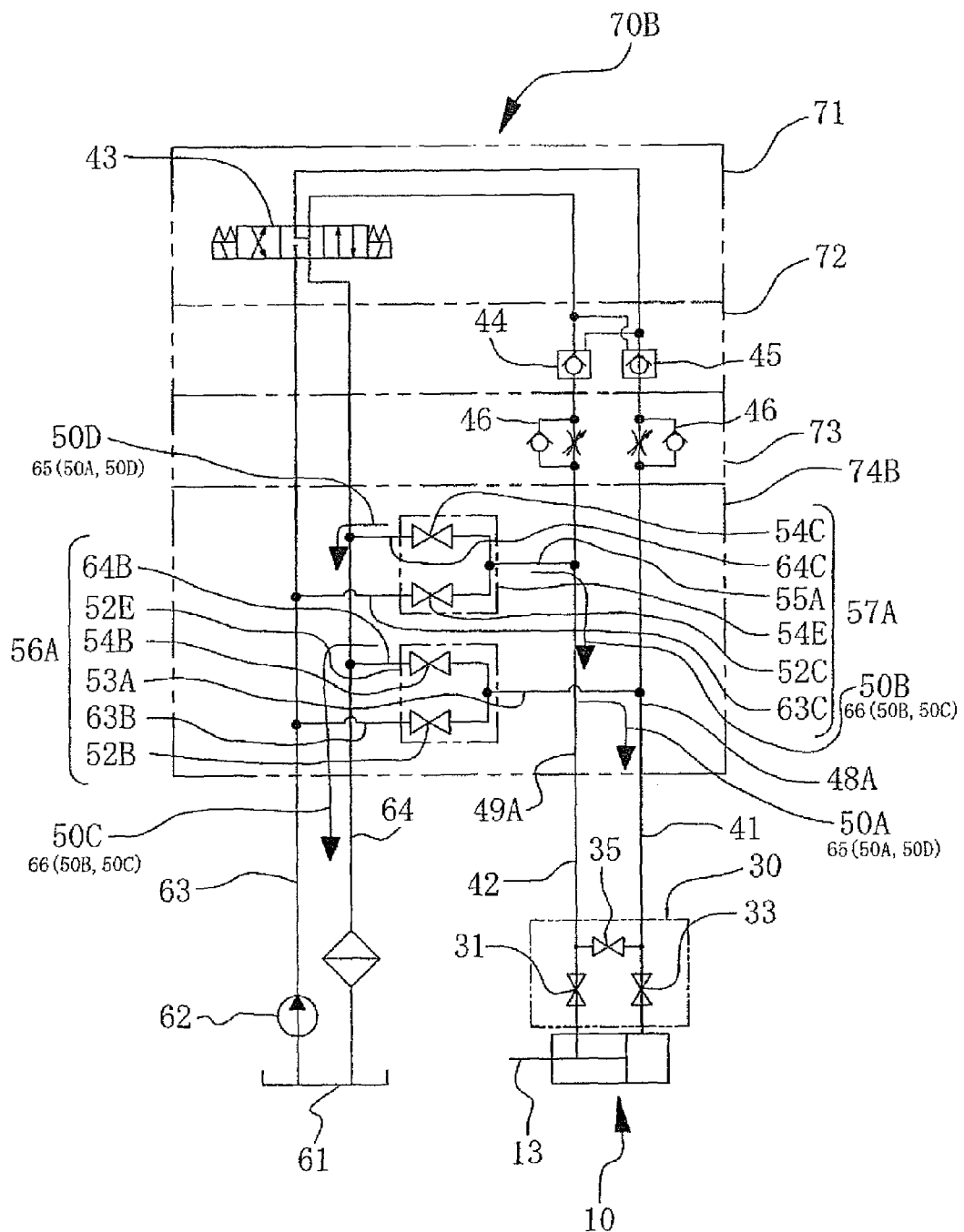
FIG. 6 shows a flushing circuit diagram of a hydraulic cylinder drive circuit of Second Example of Third Embodiment.
Figure 7:
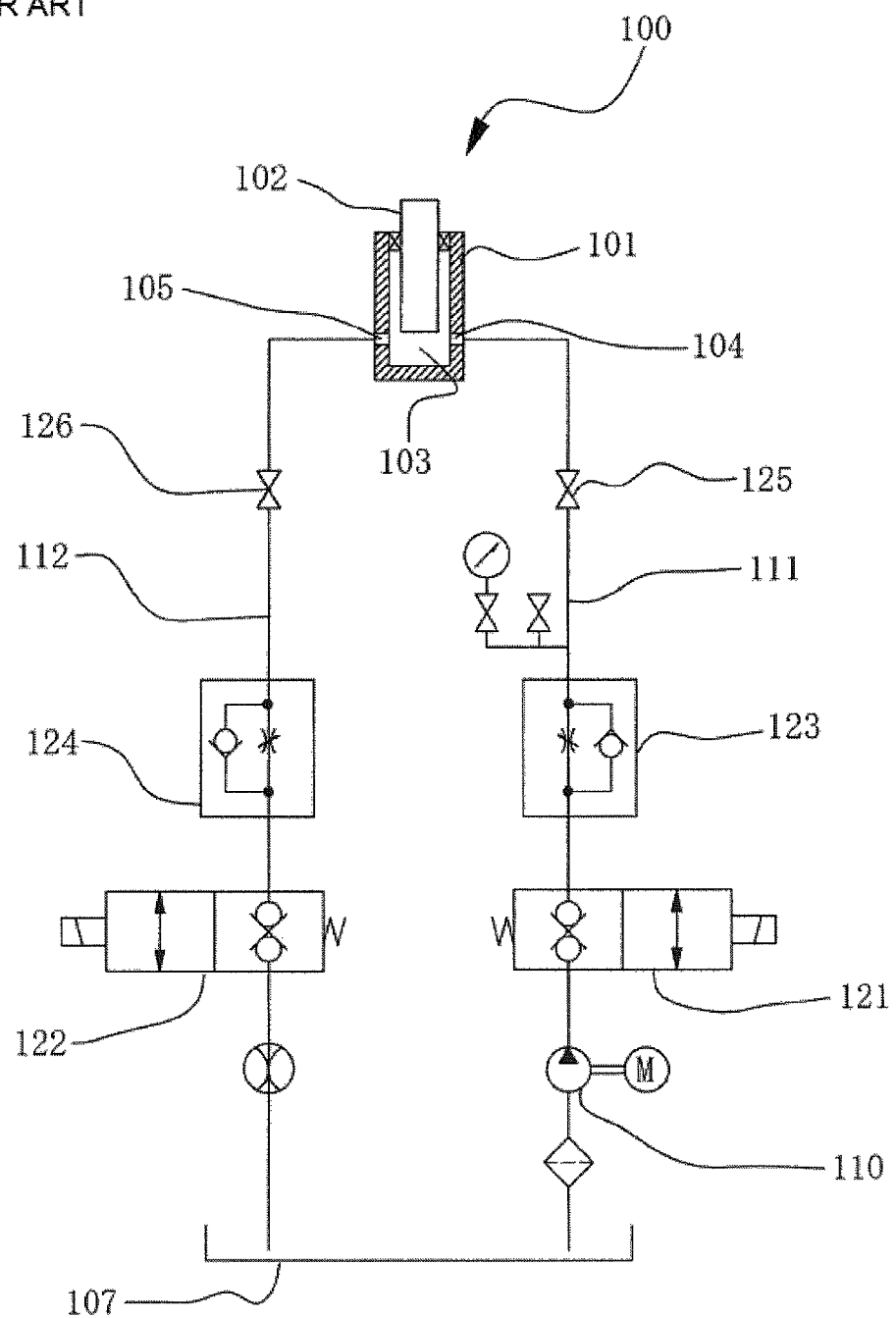
FIG. 7 is a flushing circuit diagram of a known hydraulic cylinder drive circuit.

Second Example shown in FIG. 6 is different from First Example shown in FIG. 5 in that the control valve unit 40 is embodied as a specific laminated valve unit 70B. The following therefore deals with this arrangement.

The laminated valve unit 70B is constructed by laminating and bolting the switching valve laminated valve unit 71 having the direction switching valve 43, the pilot-check laminated valve unit 72 having the pilot check valve 44 and the pilot check valve 45, the speed-control laminated valve unit 73 having the speed control valve 46 and the speed control valve 47, and a branch circuit laminated valve unit 74A provided with the head-side branch circuit 53 having the head-side stop valve 52 and the rod-side branch circuit 55 having the rod-side stop valve 54.

The pump discharge circuit 63 connected to the hydraulic pump 62 is connected to the upstream of the direction switching valve 43 of the switching valve laminated valve unit 71 via an internal path penetrating the laminated valve units of the laminated valve unit 70B. Similarly, the tank circuit 64 connected to the tank 61 is connected to the upstream of the direction switching valve 43 of the switching valve laminated valve unit 71 via an internal path penetrating the above-described laminated valve units of the laminated valve unit 70.

To the downstream of the direction switching valve 43 are connected: an in-valve rod-side supply/discharge circuit 49 connected to the pilot check valve 44 of the pilot-check laminated valve unit 72, the speed control valve 46 of the speed-control laminated valve unit 73, and the lowermost circuit 49A of the branch circuit laminated valve unit 74B; and an in-valve rod-side supply/discharge circuit 48 connected to the pilot check valve 45 of the pilot-check laminated valve unit 72, the speed control valve 47 of the speed-control laminated valve unit 73, and the lowermost circuit 48A of the branch circuit laminated valve unit 74B.

The head-side lowermost circuit 48A of the branch circuit laminated valve unit 74B is connected to the head-side pressure chamber 14 of the hydraulic cylinder 10 via the head-side supply/discharge circuit 41 and the multifunction valve 30, whereas the in-valve rod-side lowermost circuit 49A of the branch circuit laminated valve unit 74B is connected to the rod-side pressure chamber 15 of the hydraulic cylinder 10 via the rod-side supply/discharge circuit 42 and the multifunction valve 30.

A head-side bypass circuit 56A bypassing the control valve unit 40 in the branch circuit laminated valve unit 74B is constituted by a head-side branch circuit 53C branching from the head-side lowermost circuit 48A connected to the head-side supply/discharge circuit 41 of the control valve unit 40, a pump-side branch circuit 63B branching from the pump discharge circuit 63, a pump-side stop valve 52B which is connected to the tank circuit 64B branching from the tank circuit 64 and connects/disconnects the head-side branch circuit 53C to/from the pump-side branch circuit 63B, and a tank-side stop valve 54B which connects/disconnects the head-side branch circuit 53C to/from the tank circuit 64B.

A rod-side bypass circuit 57A bypassing the control valve unit 40 in the branch circuit laminated valve unit 74B is constituted by a rod-side branch circuit 55A branching from the rod-side lowermost circuit 49A connected to the head-side supply/discharge circuit 42 of the control valve unit 40, a pump-side branch circuit 63C branching from the pump discharge circuit 63, a pump-side stop valve 52C which is connected to the tank-side branch circuit 64C branching from the tank circuit 64 and connects/disconnects the rod-side branch circuit 55A to/from the pump-side branch circuit 63C, and a tank-side stop valve 54C which connects/disconnects the rod-side branch circuit 55A to/from the tank-side branch circuit 64C.

In FIG. 6, a pump-side bypass circuit 50A is constructed in the head-side bypass circuit 56A by opening the pump-side stop valve 52B of the head-side bypass circuit 56A, a tank-side bypass circuit 50D is constructed in the rod-side bypass circuit 57A by opening the tank-side stop valve 54C of the rod-side bypass circuit 57A, and a clockwise flushing circuit 65 is constructed by opening the bypass on-off valve 35 of the multifunction valve 30.

As the discharge hydraulic oil of the hydraulic pump 62 is supplied to this clockwise flushing circuit 65, the hydraulic oil reaches the pump discharge circuit 63, the head-side bypass circuit 56A, the head-side lowermost circuit 48A, the head-side supply/discharge circuit 41, the bypassing circuit 36, the rod-side lowermost circuit 49A, the rod-side supply/discharge circuit 42, and the rod-side bypass circuit 57A. As the pilot check valve 44 is closed by the in-valve rod-side supply/discharge circuit 49, the oil returns the tank 61 via the tank-side bypass circuit 50B and the flushing is conducted.

While in the example shown in FIG. 6 the in-valve head-side supply/discharge circuit 48 is closed by the pilot check valve 44, even when the pilot check valve 44 is not provided, almost entirety of the hydraulic oil returns via the rod-side bypass circuit 57A because the flow resistance of the tank-side bypass circuit 50D constructed in the rod-side bypass circuit 57A is lower than the flow resistance of the control valve unit 40.

In FIG. 6, a tank-side bypass circuit 50B is constructed in the head-side bypass circuit 56A by opening the tank-side stop valve 54B of the head-side bypass circuit 56A, a pump-side bypass circuit 50C is constructed in the rod-side bypass circuit 57A by opening the pump-side stop valve 52C of the rod-side bypass circuit 57A, and a counterclockwise flushing circuit 66 is constructed by opening the bypass on-off valve 35 of the multifunction valve 30.

As the discharge hydraulic oil of the hydraulic pump 62 is supplied to the counterclockwise flushing circuit 66, the hydraulic oil reaches the pump discharge circuit 63, the rod-side bypass circuit 57A, the rod-side lowermost circuit 49A, the rod-side supply/discharge circuit 42, the bypassing circuit 36, the head-side supply/discharge circuit 41, the head-side lowermost circuit 48A, and the head-side bypass circuit 56A. As the in-valve head-side supply/discharge circuit 48 is closed by the pilot check valve 45, the oil returns the tank 61 via the head-side bypass circuit 56A and the flushing is conducted.

While in the example shown in FIG. 6 the in-valve rod-side supply/discharge circuit 49 is closed by the pilot check valve 45, even if the pilot check valve 45 is not provided, almost entirety of the hydraulic oil returns via the rod-side bypass circuit 57A because the flow resistance of the tank-side bypass circuit 50B constructed in the head-side bypass circuit 56A is lower than the flow resistance of the control valve unit 40.

Furthermore, in FIG. 6, when the flushing is conducted with the clockwise flushing circuit 65 being formed, as the bypass on-off valve 35 of the multifunction valve 30 is closed and the head-side on-off valve 31 and the rod-side stop valve 33 are opened, the rod 13 of the hydraulic cylinder 10 is moved outward. With this operation, the contaminated hydraulic oil in the rod-side pressure chamber 15 of the hydraulic cylinder 10 is exhausted to the rod-side supply/discharge circuit 42, and the bypass on-off valve 35 is closed again and the flushing is conducted.

Similarly, when the flushing is conducted with the counterclockwise flushing circuit 66 being formed, as the bypass on-off valve 35 of the multifunction valve 30 is closed and the head-side on-off valve 31 and the rod-side on-off valve 33 are opened, the rod 13 of the hydraulic cylinder 10 is drawn inward. With this operation, the contaminated hydraulic oil in the head-side pressure chamber 14 of the hydraulic cylinder 10 is exhausted to the head-side supply/discharge circuit 41, and the bypass on-off valve 35 is closed again and the flushing is conducted. As such, the flushing of the hydraulic cylinder 10 is carried out.

REFERENCE SIGNS LIST

10 HYDRAULIC CYLINDER
11 CYLINDER MAIN BODY
13 ROD
14 HEAD-SIDE PRESSURE CHAMBER
15 ROD-SIDE PRESSURE CHAMBER
30 MULTIFUNCTION VALVE
31 HEAD-SIDE ON-OFF VALVE 3
32 HEAD-SIDE IN-VALVE SUPPLY/DISCHARGE CIRCUIT
33 ROD-SIDE ON-OFF VALVE
34 ROD-SIDE IN-VALVE SUPPLY/DISCHARGE CIRCUIT
35 BYPASS ON-OFF VALVE 35
36 BYPASSING CIRCUIT
37 VALVE MAIN BODY
40 CONTROL VALVE UNIT
41 HEAD-SIDE SUPPLY/DISCHARGE CIRCUIT
42 ROD-SIDE SUPPLY/DISCHARGE CIRCUIT
43 DIRECTION SWITCHING VALVE
44 PILOT CHECK VALVE
45 PILOT CHECK VALVE
46 SPEED CONTROL VALVE
47 SPEED CONTROL VALVE
48 IN-VALVE HEAD-SIDE SUPPLY/DISCHARGE CIRCUIT
48A HEAD-SIDE LOWERMOST CIRCUIT 48A
49 IN-VALVE ROD-SIDE SUPPLY/DISCHARGE CIRCUIT
49A ROD-SIDE LOWERMOST CIRCUIT 49A
50 BYPASS CIRCUIT
51 BRANCHING TANK CIRCUIT
52 HEAD-SIDE VALVE
53 HEAD-SIDE BRANCH CIRCUIT
54 ROD-SIDE VALVE
55 ROD-SIDE BRANCH CIRCUIT
56 HEAD-SIDE SELECTION BYPASS CIRCUIT
57 ROD-SIDE SELECTION BYPASS CIRCUIT
61 TANK
62 HYDRAULIC PUMP
63 PUMP DISCHARGE CIRCUIT

64 TANK CIRCUIT
70 LAMINATED VALVE UNIT
71 SWITCHING VALVE LAMINATED VALVE UNIT
72 PILOT-CHECK LAMINATED VALVE UNIT
73 SPEED CONTROL VALVE LAMINATED VALVE UNIT
74 BRANCH CIRCUIT LAMINATED VALVE UNIT

The invention claimed is:

1. A flushing circuit for a hydraulic cylinder drive circuit, comprising:
a hydraulic pump connected to a tank of hydraulic oil to generate pressurized hydraulic oil;
a hydraulic cylinder including a piston which slidably enters a cylinder main body and to which a piston rod is fixed and a head-side pressure chamber and a rod-side pressure chamber which are formed by the piston and the cylinder main body;
a multifunction valve including:
  a head-side in-valve supply/discharge circuit connected to the head-side pressure chamber, and having a head-side on-off valve;
  a rod-side in-valve supply/discharge circuit connected to the rod-side pressure chamber and having a rod-side on-off valve; and
  a bypassing circuit having a bypass on-off valve, which is connected to the head-side in-valve supply/discharge circuit and the rod-side in-valve supply/discharge circuit at a side of the head-side on-off valve and the rod-side on-off valve opposite to the side connected to the hydraulic cylinder, the bypass on-off valve being adapted to be manually or electrically operated to turn on and off;
a control valve unit including:
  an in-valve head-side supply/discharge circuit to which a head-side supply/discharge circuit which is connected to the head-side in-valve supply/discharge circuit is connected;
  an in-valve rod-side supply/discharge circuit to which a rod-side supply/discharge circuit which is connected to the rod-side in-valve supply/discharge circuit is connected; and
  a direction switching valve which switchably connects the in-valve head-side supply/discharge circuit and the in-valve rod-side supply/discharge circuit with the hydraulic pump and the tank;
a pump-side bypass circuit bypassing the control valve unit and including a pump-side stop valve which has an opening and closing function and connects a pump-side branch circuit branching from a pump discharge circuit of the hydraulic pump with the head-side supply/discharge circuit; and
a tank-side bypass circuit bypassing the control valve unit and including a tank-side stop valve which has an opening and closing function and connects a tank-side branch circuit branching from a tank circuit connected to the tank with the rod-side supply/discharge circuit,
wherein, a flushing circuit for returning discharge hydraulic oil of the hydraulic pump to the tank is constructed by the pump-side bypass circuit, the bypassing circuit, and the tank-side bypass circuit.

2. A flushing circuit for a hydraulic cylinder drive circuit, comprising:
a hydraulic pump connected to a tank of hydraulic oil to generate pressurized hydraulic oil;
a hydraulic cylinder including a piston which slidably enters a cylinder main body and to which a piston rod is fixed and a head-side pressure chamber and a rod-side pressure chamber which are formed by the piston and the cylinder main body;
a multifunction valve including:
  a head-side in-valve supply/discharge circuit connected to the head-side pressure chamber, and having a head-side on-off valve;
  a rod-side in-valve supply/discharge circuit connected to the rod-side pressure chamber and having a rod-side on-off valve; and
  a bypassing circuit having a bypass on-off valve, which is connected to the head-side in-valve supply/discharge circuit and the rod-side in-valve supply/discharge circuit at a side of the head-side on-off valve and the rod-side on-off valve opposite to the side connected to the hydraulic cylinder, the bypass on-off valve being adapted to be manually or electrically operated to turn on and off; and
a control valve unit including:
  an in-valve head-side supply/discharge circuit to which a head-side supply/discharge circuit which is connected to the head-side in-valve supply/discharge circuit is connected;
  an in-valve rod-side supply/discharge circuit to which a rod-side supply/discharge circuit which is connected to the rod-side in-valve supply/discharge circuit is connected; and
  a direction switching valve which switchably connects the in-valve head-side supply/discharge circuit and the in-valve rod-side supply/discharge circuit with the hydraulic pump and the tank;
wherein, the control valve unit includes:
  a pump-side bypass circuit including a pump-side stop valve which has an opening and closing function and connects a pump-side branch circuit branching from a pump discharge circuit of the hydraulic pump with the lowermost portion of the in-valve head-side supply/discharge circuit; and
  a tank-side bypass circuit including a tank-side stop valve which has an opening and closing function and connects a tank-side branch circuit branching from a tank circuit connected to the tank with the lowermost portion of the in-valve rod-side supply/discharge circuit, and
wherein, a flushing circuit for returning discharge hydraulic oil of the hydraulic pump to the tank is constructed by the pump-side bypass circuit, the bypassing circuit, and the tank-side bypass circuit.

3. A flushing circuit for a hydraulic cylinder drive circuit, comprising:
a hydraulic pump connected to a tank of hydraulic oil to generate pressurized hydraulic oil;
a hydraulic cylinder including a piston which slidably enters a cylinder main body and to which a piston rod is fixed and a head-side pressure chamber and a rod-side pressure chamber which are formed by the piston and the cylinder main body;
a multifunction valve including:
  a head-side in-valve supply/discharge circuit connected to the head-side pressure chamber and having a head-side on-off valve;
  a rod-side in-valve supply/discharge circuit connected to the rod-side pressure chamber and having a rod-side on-off valve; and
  a bypassing circuit having a bypass on-off valve, which is connected to the head-side in-valve supply/discharge circuit with and the rod-side in-valve supply/discharge circuit at a side of the head-side on-off valve and the rod-side on-off valve opposite to the side connected to the hydraulic cylinder, the bypass on-off valve being adapted to be manually or electrically operated to turn on and off;

a control valve unit including:

an in-valve head-side supply/discharge circuit to which a head-side supply/discharge circuit which is connected to the head-side in-valve supply/discharge circuit is connected;

an in-valve rod-side supply/discharge circuit to which a rod-side supply/discharge circuit which is connected to the rod-side in-valve supply/discharge circuit is connected; and a direction switching valve which switchably connects the in-valve head-side supply/discharge circuit and the in-valve rod-side supply/discharge circuit with the hydraulic pump and the tank;

a rod-side bypass circuit bypassing the control valve unit and including a pump-side valve which has an opening and closing function and connects a pump-side branch circuit branching from a pump discharge circuit of the hydraulic pump with the rod-side supply/discharge circuit; and a head-side bypass circuit bypassing the control valve unit and including a tank-side valve which has an opening and closing function and connects a tank-side branch circuit branching from a tank circuit connected to the tank with the head-side supply/discharge circuit, wherein, a flushing circuit for returning discharge hydraulic oil of the hydraulic pump to the tank is constructed by the head-side bypass circuit, the bypassing circuit, and the rod-side bypass circuit.

4. A flushing circuit for a hydraulic cylinder drive circuit, comprising:

a hydraulic pump connected to a tank of hydraulic oil to generate pressurized hydraulic oil;

a hydraulic cylinder including a piston which slidably enters a cylinder main body and to which a piston rod is fixed and a head-side pressure chamber and a rod-side pressure chamber which are formed by the piston and the cylinder main body;

a multifunction valve including:

a head-side in-valve supply/discharge circuit connected to the head-side pressure chamber, and having a head-side on-off valve;

a rod-side in-valve supply/discharge circuit connected to the rod-side pressure chamber and having a rod-side on-off valve;

a bypassing circuit having a bypass on-off valve, which is connected to the head-side in-valve supply/discharge circuit and the rod-side in-valve supply/discharge circuit at a side of the head-side on-off valve and the rod-side on-off valve opposite to the side connected to the hydraulic cylinder, the bypass on-off valve being adapted to be manually or electrically operated to turn on and off; and a control valve unit including:

an in-valve head-side supply/discharge circuit to which a head-side supply/discharge circuit which is connected to the head-side in-valve supply/discharge circuit is connected;

an in-valve rod-side supply/discharge circuit to which a rod-side supply/discharge circuit which is connected to the rod-side in-valve supply/discharge circuit is connected; and a direction switching valve which switchably connects the in-valve head-side supply/discharge circuit and the in-valve rod-side supply/discharge circuit with the hydraulic pump and the tank;

wherein, the control valve unit includes:

a rod-side bypass circuit including a pump-side stop valve which has an opening and closing function and connects a pump-side branch circuit branching from a pump discharge circuit of the hydraulic pump with the lowermost portion of the in-valve rod-side supply/discharge circuit; and a head-side bypass circuit including a tank-side stop valve which has an opening and closing function and connects a tank-side branch circuit branching from a tank circuit connected to the tank with the lowermost portion of the in-valve head-side supply/discharge circuit, and wherein, a flushing circuit for returning discharge hydraulic oil of the hydraulic pump to the tank is constructed by the head-side bypass circuit, the bypassing circuit, and the rod-side bypass circuit.

* * * * *